US012711442B2

(12) United States Patent
Verma et al.

(10) Patent No.: US 12,711,442 B2
(45) Date of Patent: Aug. 18, 2026

(54) METHODS AND SYSTEMS FOR SERVER FAILURE PREDICTION USING SERVER LOGS

(71) Applicant: MASTERCARD INTERNATIONAL INCORPORATED, Purchase, NY (US)

(72) Inventors: Sangam Verma, Gurgaon (IN); Yatin Katyal, Rohtak (IN); Ankur Saraswat, Gurgaon (IN); Sonali Syngal, Gurgaon (IN); Kandukuri Karthik, Nalgonda (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1012 days.

(21) Appl. No.: 17/318,803

(22) Filed: May 12, 2021

(65) Prior Publication Data

US 2021/0357282 A1 Nov. 18, 2021

(30) Foreign Application Priority Data

May 13, 2020 (IN) ............................ 202041020249

(51) Int. Cl.
*G06Q 10/0633* (2023.01)
*G06F 11/07* (2006.01)
(Continued)

(52) U.S. Cl.
CPC ..... *G06Q 10/0633* (2013.01); *G06F 11/0709* (2013.01); *G06F 11/0784* (2013.01);
(Continued)

(58) Field of Classification Search
CPC ............. G06Q 10/0633; G06F 11/0709; G06F 11/0784; G06F 11/3419; G06F 11/3476;
(Continued)

(56) References Cited

U.S. PATENT DOCUMENTS 10,289,509 B2 * 5/2019 Xu ...................... G06F 11/2263
10,373,056 B1 8/2019 Andoni et al.
(Continued)

FOREIGN PATENT DOCUMENTS

KR 101984730 B1 6/2019
WO WO-2019/060327 A1 3/2019

OTHER PUBLICATIONS

Krizek et al., "Feature Condensing Algorithm for Feature Selection" (Year: 2008).*
(Continued)

*Primary Examiner* — Abdullah Al Kawsar
*Assistant Examiner* — Gary Mac
(74) *Attorney, Agent, or Firm* — Pillsbury Winthrop Shaw Pittman LLP

(57) ABSTRACT

Embodiments provide methods and systems of predicting server failures. A method may include accessing distinct log clusters representing instructions executed in server, applying first density machine learning model over input vector of distinct log clusters, with length equal to number of distinct log clusters, for obtaining first prediction output, applying first sequential machine learning model over time length sequence of distinct log clusters for obtaining second prediction output, applying second density machine learning model over input vector for obtaining third prediction output, applying second sequential machine learning model over time length sequence of distinct log clusters for obtaining fourth prediction output, aggregating first, second, third and fourth prediction outputs by ensemble model, and predicting likelihood of next log clusters to have anomalous behavior based on the aggregating. First density and first sequential models are trained by normal logs. Second density and second sequential models are trained by abnormal logs.

14 Claims, 14 Drawing Sheets

(51) Int. Cl.

| | |
|---|---|
| ***G06F 11/34*** | (2006.01) |
| ***G06F 18/214*** | (2023.01) |
| ***G06N 3/044*** | (2023.01) |
| ***G06N 3/0442*** | (2023.01) |
| ***G06N 3/045*** | (2023.01) |
| ***G06N 3/0455*** | (2023.01) |
| ***G06N 3/084*** | (2023.01) |
| ***G06N 3/0895*** | (2023.01) |
| ***G06N 20/20*** | (2019.01) |

(52) U.S. Cl.
CPC ...... *G06F 11/3419* (2013.01); *G06F 11/3476* (2013.01); *G06F 18/214* (2023.01); *G06N 3/045* (2023.01)

(58) Field of Classification Search
CPC ............... G06F 18/214; G06F 11/3006; G06F 11/3447; G06F 21/552; G06N 3/045; G06N 3/044; G06N 3/084; G06N 20/20
See application file for complete search history.

(56) References Cited

U.S. PATENT DOCUMENTS

| | | | | |
|---|---|---|---|---|
| 10,613,962 | B1 | 4/2020 | Delange | |
| 2016/0292592 | A1 | 10/2016 | Patthak | |
| 2018/0096261 | A1 | 4/2018 | Chu et al. | |
| 2018/0293501 | A1* | 10/2018 | Ambati | G06N 20/20 |
| 2020/0099709 | A1* | 3/2020 | Vasseur | H04L 45/22 |

OTHER PUBLICATIONS

Rekesh, "Deep Learning Log Anomaly Detection for Cybersecurity" (Year: 2019).*

Thill, Markus, et al. "Anomaly Detection in Electrocardiogram Readings with Stacked LSTM Networks." ITAT 2473 (2019): 17-25. (Year: 2019).*

Rekesh, John: "Deep Learning Log Anomaly Detection for Cybersecurity", Internet Article, Dec. 28, 2019 (Dec. 28, 2019), XP055841861, Retrieved from the Internet: URL:https://www.linkedin.com/pulse/deep-learning-log-anomaly-detectio••cybersecu rity-jo h n-rekesh [retrieved on Sep. 16, 2021].

Jansen, Stefan: "Hands-On Machine Learning for Algorithmic Trading: Design and implement investment strategies based on smart algorithms that learn from data using Python", Dec. 31, 2018 (Dec. 31, 2018), Packt Publishing, XP055841890, ISBN: 978-1-78934-641-1 pp. ToC,557-570.

Grover, Aarish: "Anomaly Detection for Application Log Data", Master Thesis, May 30, 2018 (May 30, 2018), XP055841857, DOI: 10.31979/etd.znsb-bw4d Retrieved from the Internet: URL:https://scholarworks.sjsu.edu/cgi/viewcontent.cgi? article= 1640&context=etd_projects [retrieved on Sep. 16, 2021].

Alla, Sridhar et al.: "Beginning Anomaly Detection Using Python-Based Deep Learning", Oct. 11, 2019 (Oct. 11, 2019), XP055841924, ISBN: 978-1-4842-5176-8 pp. ToC, 123-178,213-223.

Office Action issued by the European Patent Office on Oct. 23, 2024 in related European Application No. 21171971, filed on May 12, 2021.

* cited by examiner

FIG. 6B

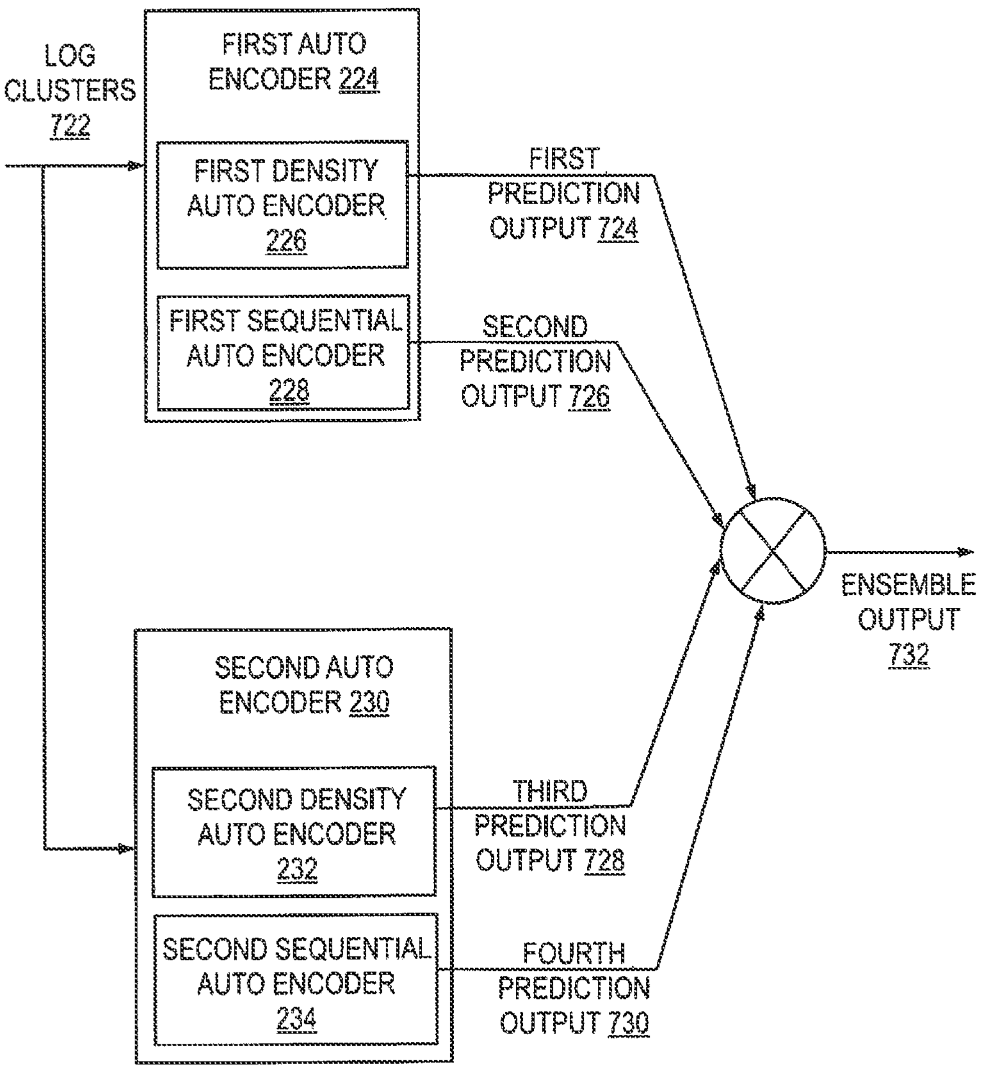
FIG. 7B

| TECHNIQUES USED FOR SERVER ANOMALY PREDICTION | TRUE ALERTS | FALSE ALERTS |
|---|---|---|
| 1002 USING ONLY SEQUENTIAL MACHINE LEARNING MODEL | 26 | 16000 |
| 1004 USING ONLY DENSITY MACHINE LEARNING MODEL | 23 | 37000 |
| 1006 ENSEMBLING OF DENSITY AND SEQUENTIAL MACHINE LEARNING MODELS | 26 | 7200 |
| 1008 **ENSEMBLE MODEL 1:** 2 PART MODEL WHICH CONSISTS OF: ENSEMBLING OF DENSITY AND SEQUENTIAL MACHINE LEARNING MODELS, TRAINED ON NORMAL SERVER LOGS ENSEMBLING OF DENSITY AND SEQUENTIAL MACHINE LEARNING MODELS, TRAINED ON ABNORMAL SERVER LOGS | 21 | 31 |
| 1010 **ENSEMBLE MODEL 2:** ENSEMBLING USING LSTM OF DENSITY AND SEQUENTIAL MODELS TRAINED ON NORMAL SERVER LOGS AND DENSITY AND SEQUENTIAL MODELS TRAINED ON ABNORMAL SERVER LOGS | 26 | 18 |

METHODS AND SYSTEMS FOR SERVER FAILURE PREDICTION USING SERVER LOGS

RELATED APPLICATIONS

This application claims priority to Indian Application Serial No. 202041020249, filed May 13, 2020, which is incorporated herein by reference in its entirety.

TECHNICAL FIELD

The present disclosure relates to methods and systems for server failure prediction using server logs and, more particularly to, for detecting server failures proactively using the server logs by utilizing machine learning techniques.

BACKGROUND

Most business applications are structured as high-level work flows that include one or more stages of interactions between user devices and one or more servers. For example, a work flow can include a stage for processing payment transactions received from acquirer servers, which proceeds to an authorization stage for processing information received in a payment transaction request, which then proceeds to a final checkout stage for sending the payment transaction request to issuer servers for approval. The flow of data between the various stages of the work flows is generally handled by software modules. These software modules may be executing on different servers, located in different networks. Each server generates logs to the operations and activities performed by the server. The logs can be analyzed to identify failures in the work flow. In general, anomalous log occurrences indicate server failures.

In existing systems, server anomalies are detected manually on a reactive basis by analyzing associated logs of the server which leads to loss both in terms of business and effort. Further, current approaches to automate server failure prediction process involve fitting a probability distribution on normal logs (i.e., "healthy logs") and classifying logs as anomalies that are not appropriate to the probability distribution. In addition, the traditional statistical approaches for server failure prediction provide false alerts due to complexity of the log data, structure of the logs, and functions performed by the servers.

Thus, there is a need for a technical solution for predicting a server failure via electronic means to an unprecedented manner/degree, through use of artificial intelligence and machine learning.

SUMMARY

Various embodiments of the present disclosure provide systems, methods, electronic devices and computer program products for predicting server failures using server logs.

In an embodiment, a computer-implemented method is disclosed. The computer-implemented method performed by a processor includes accessing a set of distinct log clusters associated with a server. The set of distinct log clusters represents instructions executed in the server. The computer-implemented method includes applying a first density machine learning model over an input vector associated with the set of distinct log clusters for obtaining a first prediction output. The input vector has a length equal to a number of the set of distinct log clusters and the first density machine learning model is trained based on normal log data associated with the server. The computer-implemented method includes applying a first sequential machine learning model over a time length sequence of the set of distinct log clusters for obtaining a second prediction output. The first sequential machine learning model is trained based on the normal log data associated with the server. The computer-implemented method includes applying a second density machine learning model over the input vector for obtaining a third prediction output and applying a second sequential machine learning model over the time length sequence of the set of distinct log clusters for obtaining a fourth prediction output. The second density machine learning model and the second sequential machine learning model are trained based on abnormal log data associated with the server. The computer-implemented method further includes aggregating the first, second, third and fourth prediction outputs based on an ensemble model and predicting a likelihood of next log clusters to have anomalous behavior based on a step of the aggregating.

In another embodiment, an anomaly prediction system is disclosed. The anomaly prediction system includes a communication interface, a memory including executable instructions, and a processor communicably coupled to the communication interface. The processor is configured to execute the executable instructions to cause the anomaly prediction system to at least access a set of distinct log clusters associated with a server. The set of distinct log clusters represents instructions executed in the server. The anomaly prediction system is caused to apply a first density machine learning model over an input vector associated with the set of distinct log clusters for obtaining a first prediction output. The input vector has a length equal to a number of the set of distinct log clusters and the first density machine learning model is trained based on normal log data associated with the server. The anomaly prediction system is caused to apply a first sequential machine learning model over a time length sequence of the set of distinct log clusters for obtaining a second prediction output. The first sequential machine learning model is trained based on the normal log data associated with the server. The anomaly prediction system is caused to apply a second density machine learning model over the input vector for obtaining a third prediction output and apply a second sequential machine learning model over the time length sequence of the set of distinct log clusters for obtaining a fourth prediction output. The second density machine learning model and the second sequential machine learning model are trained on abnormal log data associated with the server. The anomaly prediction system is further caused to aggregate the first, second, third and fourth prediction outputs based on an ensemble model and predict a likelihood of next log clusters to have anomalous behavior based on the aggregation.

In yet another embodiment, a yet another computer-implemented method is disclosed. The computer-implemented method performed by a processor includes accessing a set of distinct log clusters associated with a server. The set of distinct log clusters represents instructions executed in the server. The computer-implemented method includes applying a first density machine learning model over an input vector associated with the set of distinct log clusters for obtaining a first prediction output. The input vector has a length equal to a number of the set of distinct log clusters and the first density machine learning model is trained based on normal log data associated with the server. The computer-implemented method includes applying a first sequential machine learning model over a time length sequence of the set of distinct log clusters for obtaining a second prediction output. The first sequential machine learning model is trained based on the normal log data associated with the server. The computer-implemented method includes generating an ensemble output of the first prediction output and the second prediction output for identifying whether server anomalies are detected or not. In response to identification of the server anomalies, the computer-implemented method includes performing applying a second density machine learning model over the input vector for obtaining a third prediction output. The second density machine learning model is trained based on abnormal log data associated with the server. The computer-implemented method further includes performing applying a second sequential machine learning model over the time length sequence of the set of distinct log clusters for obtaining a fourth prediction output, generating an ensemble output of the third prediction output and the fourth prediction output based at least part on the ensemble model, and predicting a likelihood of next log clusters to have anomalous behavior based on the ensemble output. The second sequential machine learning model is trained based on the abnormal log data associated with the server.

BRIEF DESCRIPTION OF THE FIGURES

For a more complete understanding of example embodiments of the present technology, reference is now made to the following descriptions taken in connection with the accompanying drawings in which:

FIGS. 6A and 6B, collectively, represent a simplified block diagram of a LSTM based sequential auto encoder, in accordance with an embodiment of the present disclosure;

FIG. 7B is a schematic block diagram representation of execution process (i.e., “detection process”) associated with the anomaly prediction system, in accordance with another embodiment of the present disclosure;

FIG. 10 shows experiment results of an anomaly prediction system implemented in the payment interface server, depicting comparative analysis of different models used in some embodiments of the present disclosure with respect to conventional models used for server anomaly prediction.

Figure 1:
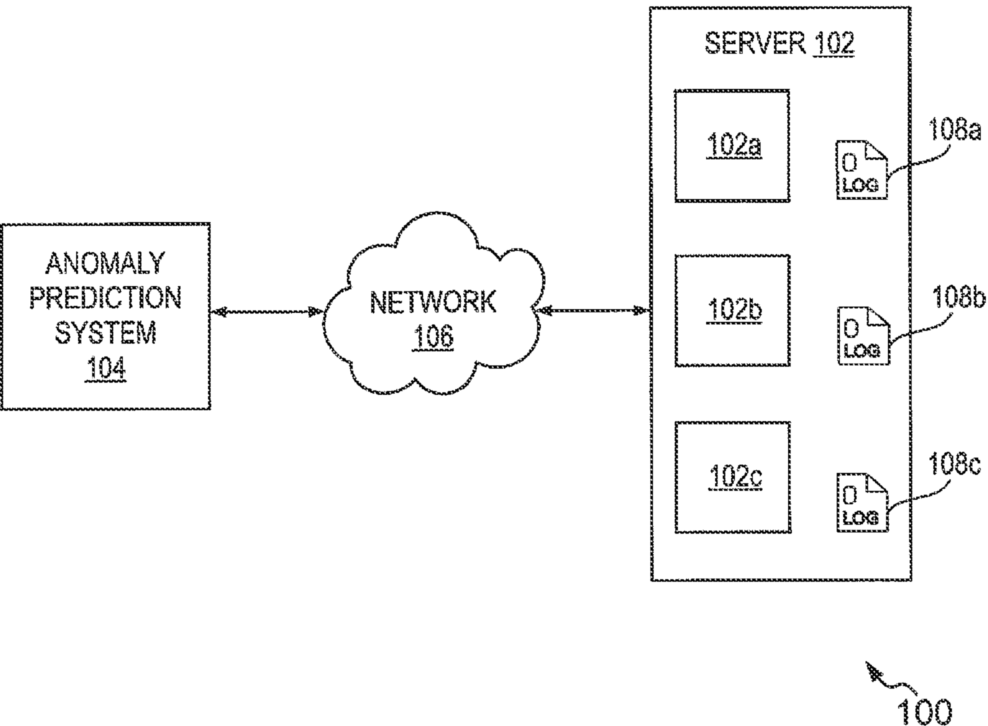
FIG. 1 is an example representation of an environment, related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to “one embodiment” or “an embodiment” means that a particular feature, structure, or characteristic described in connection with the embodiment is included in at least one embodiment of the present disclosure. The appearance of the phrase “in an embodiment” in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide methods, systems, user devices and computer program products for predicting future server failures proactively using server logs and providing alert notifications to administrators for preventing future server failures in near real time. These advanced server failure warnings permit timely preventive actions (e.g., isolation, backup, migration) to minimize failure impacts on running servers. Moreover, with server failure predictions, preventive actions are taken only on abnormal servers to greatly reduce fault tolerance cost.

In various example embodiments, the present disclosure describes an anomaly prediction system that facilitates detection of server failures before occurrence. The anomaly prediction system includes at least a processor and a memory. The processor is configured to receive server logs from a plurality of servers periodically. The processor is configured to aggregate the server logs occurred during a particular time interval and perform text pre-processing over the aggregated server logs. Each server log is parsed into a corresponding structured data sequence. Each structured data sequence is configured to include a token extracted from its corresponding log. The token represents an execution path of an application that is being tracked by the server log. The processor is configured to cluster the processed server logs having similar formats together in a set of distinct log clusters. The set of distinct log clusters represents instructions logs executed in the server. More specifically, the processor is configured to generate a vector representation of each token associated with similar server logs by using word-to-vector embedding algorithms and clusters the similar vector representation into a single log cluster.

The processor is configured to generate an input vector representing a frequency of occurrences of the set of distinct log clusters during the particular time interval (e.g., 2 hours). The length of the input vector is equal to a number of the set of distinct log clusters and a value for each index value of the input vector depicts a frequency of appearances of each associated log cluster of the set of distinct log clusters during the particular time interval (e.g., 2 hours). The processor is configured to apply a first density machine learning model over the input vector to obtain a first prediction output. The first density machine learning model is trained using normal server logs over a period of time. In other words, the first prediction output (i.e., "reconstruction error") would be low for normal server logs and would be high for abnormal server logs. The first density machine learning model is utilized for determining deviations in log clusters count within a particular time window.

The processor is also configured to apply a first sequential machine learning model over a time length sequence of multi-dimensional vectors of log clusters for obtaining a second prediction output. The multi-dimensional vectors represent the log clusters from the set of distinct log clusters which appear at different time stamps within a particular time interval. The first sequential machine learning model is trained using the normal server logs over the period of time. The first sequential machine learning model is utilized for determining deviations in a sequence of log occurrences within the particular time window.

In a similar manner, the processor is configured to apply a second density machine learning model, trained on abnormal server log data, over the input vector for obtaining a third prediction output. Further, the processor is configured to apply a second sequential machine learning model, trained on the abnormal server log data, over the time length sequence of multi-dimensional vectors representing of the set of distinct log clusters which are appeared at different time stamps within the particular time interval, for obtaining a fourth prediction output.

Thereafter, the processor is configured to aggregate or ensemble the first, second, third and fourth prediction outputs based on an ensemble model and predict a likelihood of next log clusters to have anomalous behavior based on a step of the aggregating or ensembling. A weighted average ensemble approach is utilized by the ensemble model where weighting factors associated with each prediction output are adjusted during a validation stage for providing a correct server failure prediction.

In one embodiment, the processor is configured to ensemble the first, second, third and fourth prediction outputs using a recurrent neural network model (e.g., "LSTM") based at least on the weighted average ensemble method for obtaining an ensemble output.

The processor is configured to compare the ensemble output with a predetermined threshold value for determining the likelihood of the next log clusters to have the anomalous behavior. In response to a determination that the next or future log clusters of the server have anomalous behavior, the processor is configured to send an alert to an administrator about future server failure occurrences for taking preventive actions.

Various embodiments of the present disclosure offer multiple advantages and technical effects. For instance, the present disclosure provides an anomaly prediction system for predicting server failures in near real-time which can be used to take pre-emptive actions. The anomaly prediction system is able to detect both the log sequence anomalies and the log occurrence deviation anomalies. Further, utilizing an ensemble model of the machine learning models provides more accurate predictions and reduces false alerts of server failures. Furthermore, the present disclosure provides a significantly more robust solutions because of handling simultaneous/concurrent processor execution (such as applying one or more machine learning models over the same input, simultaneously). Even further, the present disclosure improves the operations of servers because, by performing these synergistic operations to detect server anomalies, the servers will be less exposed to prolonged attacks and will be provided enhanced protections.

Various example embodiments of the present disclosure are described hereinafter with reference to FIGS. 1 to 11.

FIG. 1 illustrates an exemplary representation of an environment 100 related to at least some example embodiments of the present disclosure. Although the environment 100 is presented in one arrangement, other embodiments may include the parts of the environment 100 (or other parts) arranged otherwise depending on, for example, predicting server failures, etc. The environment 100 generally includes a plurality of servers 102*a*, 102*b*, 102*c*, and an anomaly prediction system 104, each coupled to, and in communication with (and/or with access to) a network 106. The network 106 may include, without limitation, a light fidelity (Li-Fi) network, a local area network (LAN), a wide area network (WAN), a metropolitan area network (MAN), a satellite network, the Internet, a fiber optic network, a coaxial cable network, an infrared (IR) network, a radio frequency (RF) network, a virtual network, and/or another suitable public and/or private network capable of supporting communication among two or more of the parts or users illustrated in FIG. 1, or any combination thereof. Various entities in the environment 100 may connect to the network 106 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof.

For example, the network 106 may include multiple different networks, such as a private network made accessible by the plurality of servers 102*a*, 102*b*, 102*c*, separately, and a public network (e.g., the Internet etc.) through which the plurality of servers 102*a*, 102*b*, 102*c* and the anomaly prediction system 104 may communicate. The plurality of servers 102*a*, 102*b*, and 102*c* hereinafter is collectively represented as "the server 102".

The server 102 may be, but is not limited to, network servers, data storage servers, web servers, interface/gateway servers, application servers, a cloud server, and virtual servers, etc. The server 102 includes at least one log file (e.g., log file 108*a*, 108*b*, or 108*c*), which is created and maintained by the server 102 in form of text files, consisting a list of operations that the server 102 has performed. In one non-limiting example, the server 102 is a payment interface server recording transactions in a log file. The log file contains a plurality of logs with heterogeneous textual data including information of activities performed by the payment interface server.

The anomaly prediction system 104 includes a processor and a memory. The anomaly prediction system is configured to perform one or more of the operations described herein. In general, the anomaly prediction system 104 is configured to determine a likelihood of occurrence of future server failure events. In a more illustrative manner, the anomaly prediction system 104 facilitates detection of server anomalies in a proactive manner. The anomaly prediction system 104 is a separate part of the environment 100, and may operate apart from (but still in communication with, for example, via the network 106) the plurality of servers 102*a*, 102*b*, 102*c*, (and to access data to perform the various operations described herein). However, in other embodiments, the anomaly prediction system 104 may actually be incorporated, in whole or in part, into one or more parts of the environment 100. In addition, the anomaly prediction system 104 should be understood to be embodied in at least one computing device in communication with the network 106, which may be specifically configured, via executable instructions, to perform as described herein, and/or embodied in at least one non-transitory computer readable media.

The anomaly prediction system 104 utilizes an ensemble method of machine learning models which may detect different kind of anomalous behaviors of the server 102 based on the plurality of server logs present in the log file (e.g., "log file 108*a*"). In one example, a machine learning model detects an anomaly if a particular group of server logs occurs more or less than a particular count within a specific timeframe. In another example, a machine learning model detects an anomaly if a particular log sequence does not occur as expected within the specific timeframe. Based on the above anomaly detection, the anomaly prediction system 104 predicts future server anomalies and sends alerts to administrators.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally, or alternatively, a set of systems (e.g., one or more systems) or a set of devices (e.g., one or more devices) of the environment 100 may perform one or more functions described as being performed by another set of systems or another set of devices of the environment 100.

Figure 2:
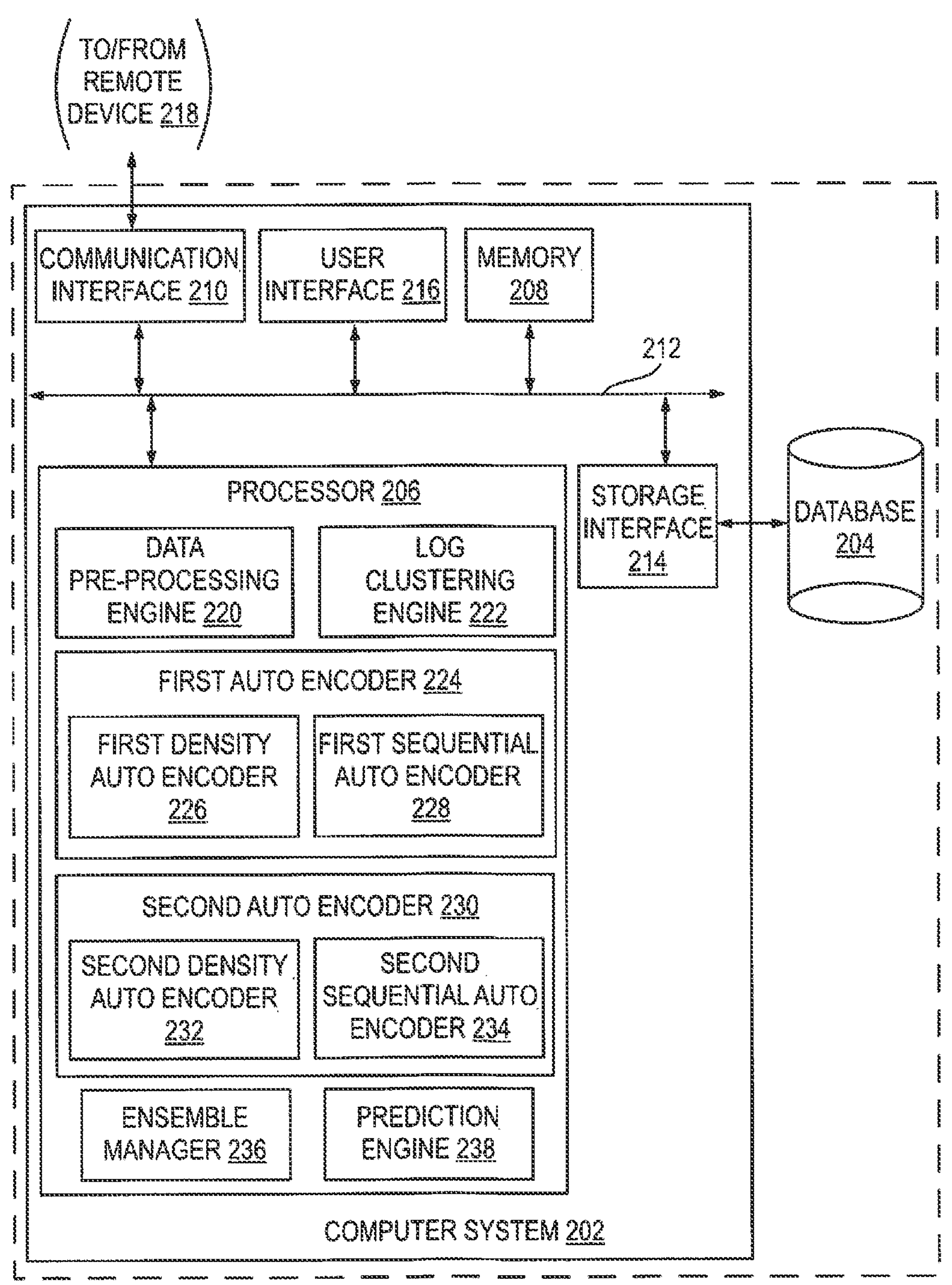
FIG. 2 is a simplified block diagram of an anomaly prediction system, in accordance with one embodiment of the present disclosure.

Referring now to FIG. 2, a simplified block diagram of an anomaly prediction system 200, is shown, in accordance with an embodiment of the present disclosure. The anomaly prediction system 200 is similar to the anomaly prediction system 104. In some embodiments, the anomaly prediction system 200 is embodied as a cloud-based and/or SaaS-based (software as a service) architecture. In some embodiments, the anomaly prediction system 200 may be implemented in a server system.

The anomaly prediction system 200 includes a computer system 202 and a database 204. The computer system 202 includes at least one processor 206 for executing instructions, a memory 208, a communication interface 210, and a user interface 216 that communicate with each other via a bus 212.

In some embodiments, the database 204 is integrated within computer system 202. For example, the computer system 202 may include one or more hard disk drives as the database 204. A storage interface 214 is any component capable of providing the processor 206 with access to the database 204. The storage interface 214 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 206 with access to the database 204.

In one embodiment, the database 204 is configured to store one or more trained machine learning models.

The processor 206 includes suitable logic, circuitry, and/or interfaces to execute operations for receiving various server logs from the server 102. Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the anomaly prediction system 200, as described herein. In another embodiment, the memory 208 may be realized in the form of a database server or a cloud storage working in conjunction with the anomaly prediction system 200, without departing from the scope of the present disclosure.

The processor 206 is operatively coupled to the communication interface 210 such that the processor 206 is capable of communicating with a remote device 218 such as, the server 102, or communicated with any entity connected to the network 106 (as shown in FIG. 1). Further, the processor 206 is operatively coupled to the user interface 216 for interacting with regulators/analysts who are responsible for preventing server failures.

It is noted that the anomaly prediction system 200 as illustrated and hereinafter described is merely illustrative of an apparatus that could benefit from embodiments of the present disclosure and, therefore, should not be taken to limit the scope of the present disclosure. It is noted that the anomaly prediction system 200 may include fewer or more components than those depicted in FIG. 2.

In one embodiment, the processor 206 includes a data pre-processing engine 220, a log clustering engine 222, a first auto encoder 224 (including first density auto encoder 226 and first sequential auto encoder 228), a second auto encoder 230 (including second density auto encoder 232 and second sequential auto encoder 234), an ensemble manager 236, and a prediction engine 238.

The data pre-processing engine 220 includes suitable logic and/or interfaces for receiving server logs from the plurality of servers 102 periodically. In one embodiment, the data pre-processing engine 220 is configured to aggregate all the server logs received in a particular time window (for example, three hours).

The data pre-processing engine 220 is configured to perform text pre-processing over the aggregated server logs (such as, for example, removing numbers, lowercase, punctuations, etc.). Each server log is parsed into a corresponding structured data sequence. In one example, to parse the server log, each piece of alphanumeric data within the server log is separated into a number/sequence of tokens using a defined set of delimiters (e.g., spaces, equal signs, colons, semicolons, etc.). Each structured data sequence is configured to include a token extracted from its corresponding server log. The token represents an execution path of an application that is being tracked by the server log. In one embodiment, to make use of server log data, the data pre-processing engine 220 is configured to interpret the server logs and filter out noise, (i.e., irrelevant data) and extract predictive features.

It should be noted that the server logs are "heterogeneous," which is used herein to denote that the logs may be generated by servers that may have been written in different programming languages and with different logging styles, producing server logs that have different structures and semantics.

The log clustering engine 222 includes suitable logic and/or interfaces for clustering the processed server logs having similar formats together in a set of distinct log clusters. The set of distinct log clusters represents instructions logs executed in the server. In one embodiment, server logs having similar syntactic structures will be clustered together, such that server logs with similar formats will align along the same pattern.

"Clustering" generally refers to a process of grouping a set of data or objects (e.g., logs, etc.) into a set of meaningful subclasses called "clusters" according to a natural grouping or structure of the server logs. Clustering generally is a form of data mining or data discovery used in unsupervised machine learning of unlabeled data.

More specifically, the log clustering engine 222 generates a vector representation of each token associated with similar server logs by using word-to-vector embedding algorithms. In one example, the word-to-vector embedding algorithms utilize natural language processing (NLP) techniques. The log clustering engine 222 may be configured to perform one or more clustering analysis on unstructured or raw text server logs using clustering algorithms. In one non-limiting example, the clustering algorithms may include, but not limited to, hierarchical clustering, K-means algorithm, kernel-based clustering algorithms, density-based clustering algorithms, spectral clustering algorithms, etc.

The first auto encoder 224 includes a first density auto encoder 226 and a first sequential auto encoder 228. The first auto encoder 224 is trained based on normal server log data (i.e., "healthy server logs") and configured to detect anomalies if the server logs appear to be unhealthy.

The first density auto encoder 226 includes suitable logic and/or interfaces for training a first density machine learning model based at least on normal server logs, which correspond to normal system execution paths. The "normal server logs" represent server logs that occur when the server 102 is working properly. The first density machine learning model may be, but not limited to, a self-supervised machine learning model which is utilized for representation learning of an input data. In one non-limiting example, the first density auto encoder 226 may be a stacked auto encoder including multiple encoder layers and decoder layers. The first density auto encoder 226 as the stacked auto encoder is explained with reference to FIG. 4.

In one embodiment, the first density auto encoder 226 is fed with an input vector representing a frequency of occurrences of the set of distinct log clusters during the particular time interval (e.g., 2 hours). The length of the input vector is equal to a number of the set of distinct log clusters and a value for each index value of the input vector depicts a frequency of appearances of each associated log cluster of the set of distinct log clusters during the particular time interval (e.g., 2 hours). In other words, the input vector has information of the number of occurrences of each distinct log cluster during the particular time interval.

The first density auto encoder 226 learns a representation learning of the input vector and tries to reconstruct the same input vector as an output. To the extent the reconstructed output from the first density auto encoder 226 differs from the original input vector, various training techniques, (such as, back propagation, stochastic gradient descent, etc.,) may be employed to adjust various weights associated with the first density auto encoder 226 to reduce the reconstruction error and train the first density auto encoder 226.

In one embodiment, the first density auto encoder 226 uses a loss function for reducing the reconstruction error by adjusting various weights associated with the first density auto encoder. The loss function is a combination of Log-Cosh loss function and a condition on a summation of frequency appearances of the set of distinct clusters that enforces the first density machine learning model to reconstruct the original input vector properly even if some log clusters are less frequent.

During an execution process, the first density auto encoder 226, after being trained/fine-tuned, is fed with an input vector including information of a frequency of occurrences of newly-arrived log clusters on a timely basis. Consequently, the first density auto encoder 226 generates an output which represents a reconstruction probability of a particular newly-arrived log cluster. If the reconstruction probability associated with particular newly-arrived log cluster is low, the particular newly-arrived log cluster is considered to have an anomaly and is marked as being "abnormal." If the reconstruction probability associated with the particular newly-arrived log cluster is high, the particular newly-arrived log cluster is considered to be a normal server log. Hence, in the execution process, the first density auto encoder 226 determines deviations of log occurrences within a particular time window.

The first sequential auto encoder 228 includes suitable logic and/or interfaces for training a first sequential machine learning model by taking a time based sequence of the normal log clusters occurred during the particular time interval as an input. The first sequential auto encoder 228 is a neural network machine translation model.

In particular, the first sequential auto encoder 228 feeds with an input time length sequence of multi-dimensional vectors representing normal server logs which appear at different time stamps within a particular time interval. The first sequential auto encoder 228 learns latent features of the sequence of the normal server logs using a Long Short-Term Memory (LSTM) encoder-decoder structure. In a more illustrative manner, the first sequential auto encoder 228 facilitates an automatic learning on different log patterns from normal execution. Additionally, this modeling ability allows the system to flag deviations from normal system execution as anomalies. The first sequential auto encoder 228 as the LSTM based sequential auto encoder is explained with reference to FIG. 6.

During the execution process, the first sequential auto encoder 228, after being trained on the normal server log sequences, determines whether sequences of newly arrived log clusters have anomalous behavior or not.

The second auto encoder 230 includes a second density auto encoder 232 and a second sequential auto encoder 234 and is trained based on unhealthy server logs.

The second density auto encoder 232 also includes similar functionality of the first density auto encoder 226 except that the second density auto encoder 232 is configured to train using abnormal server logs or failure server logs. The second density auto encoder 232 trains a second density machine learning model based on abnormal server logs of the server 102. Thus, the second density auto encoder 232 has a low reconstruction error for abnormal server logs.

The second sequential auto encoder 234 also includes similar functionality as of the first sequential auto encoder 228 except that the second sequential auto encoder 234 is configured to train a second sequential machine learning model based at least on abnormal server log sequences associated with the server 102. The abnormal log sequences are determined based at least on possible failure pinpoints of the server 102.

In one embodiment, since the first, second, third and fourth machine learning models use a learning-driven technique, it is possible to incrementally update the machine learning models (e.g., from feedback provided by a human or computer administrator) so that it can adapt to new log patterns that emerge over time. To do so, the machine learning models incrementally update their probability distribution weights during a detection phase (e.g., perhaps in response to live user feedback indicating a normal server log was incorrectly classified as an anomaly). This feedback may be incorporated immediately in a dynamic online manner to adapt to emerging new server logs. In this regard, the machine learning models can initially be trained using one set of server logs and then later tuned/refined using an entirely different set of server logs or user feedback.

In an alternate embodiment, during the execution process, newly-arrived log clusters are initially fed into the first auto encoder 224 which was trained on the healthy server logs. In one example scenario, if the first density auto encoder 226 of the first auto encoder 224 detects anomalies in a particular log cluster of the newly-arrived log clusters, the newly arrived log clusters are fed into the second auto encoder 230 which was trained on the unhealthy server logs. If one of the second density and sequential auto encoders of the second auto encoder 230 is able to reconstruct the particular log cluster of the newly-arrived log clusters successfully, it infers that the particular log cluster is an abnormal server log.

The ensemble manager 236 includes suitable logic and/or interfaces for aggregating outputs of the first and second auto encoders using an ensemble model. In one example, the ensemble model facilitates ensembling of the prediction outputs (i.e., "reconstruction error") of the first auto encoder 224 and the second auto encoder 230 using a weighted average ensemble approach. In general, the weighted average ensemble approach allows multiple machine learning models to contribute to a prediction in proportion to their trust or estimated performance.

The ensemble manager 236 also may rely on a long short-term memory (LSTM) network (or other sequence neural network) for ensembling by consuming time series sequence of prediction outputs of the first auto encoder 224 and the second auto encoder 230. In one embodiment, the ensemble model may use stacking ensemble approach where multiple LSTM networks are stacked and combined to provide a more accurate prediction, aiming to propose a more generalized model for detecting server failure before occurrence. In another embodiment, the ensemble model may use AdaBoost-LSTM based ensemble learning methods for predicting the server failure.

In one embodiment, during validation, the ensemble manager 236 adjusts weighting factors associated with the prediction outputs of the first auto encoder 224 and the second auto encoder 230 according to test dataset.

In one embodiment, the ensemble manager 236 determines or selects threshold parameters for each prediction output of the first and second auto encoder by using some optimization techniques. These threshold parameters are utilized for predicting failure conditions of the server 102.

The prediction engine 238 includes suitable logic and/or interfaces for predicting next log clusters having anomalous behavior by comparing outputs of the first auto encoder 224 and the second auto encoder 230 with threshold parameters. If the prediction outputs (i.e., "reconstruction error") are beyond the associated threshold parameters, the prediction engine 238 reports to administrators about future occurrence of the server failure.

Figure 3:
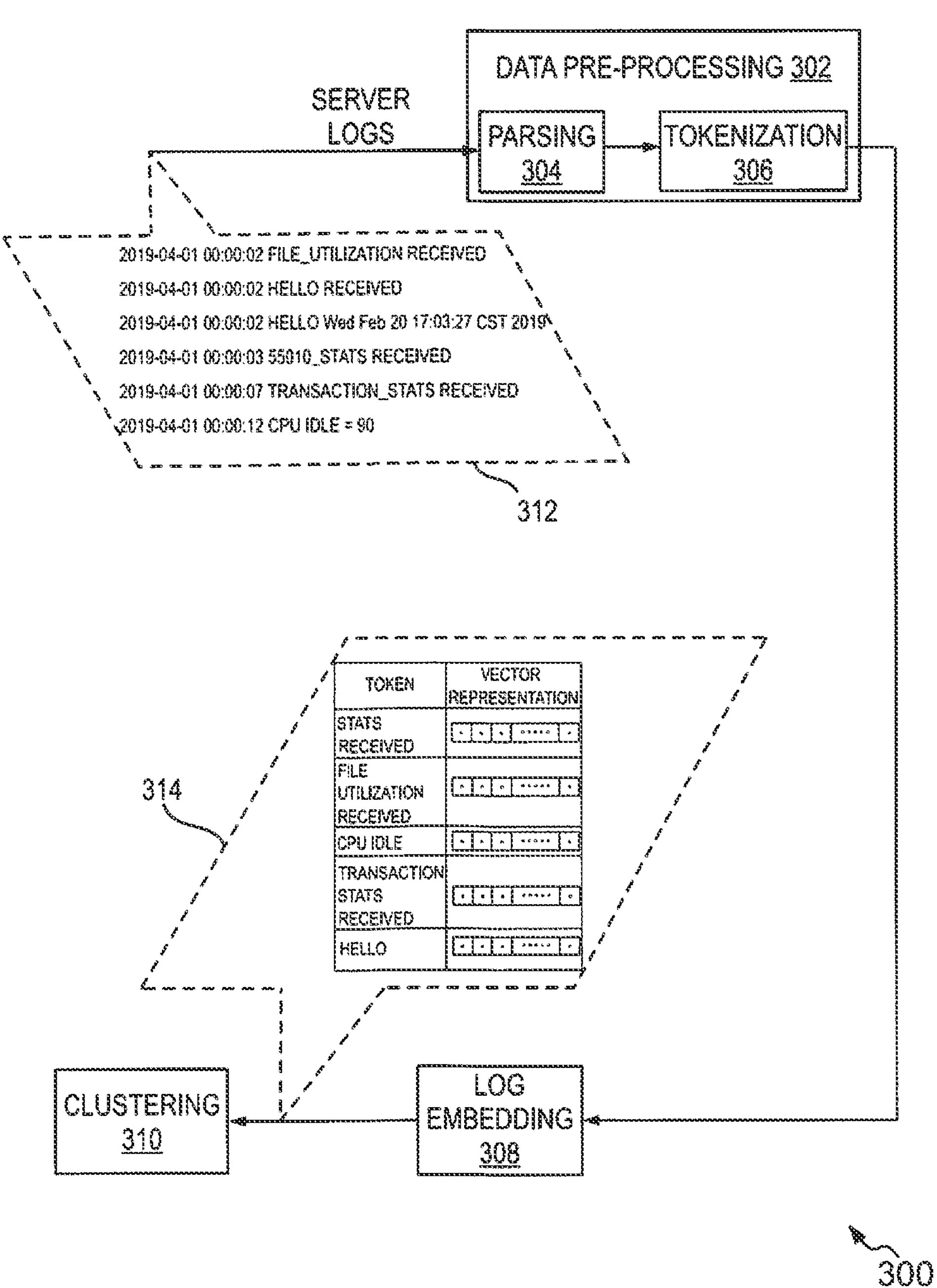
FIG. 3 is a schematic block diagram representation of a process flow for data pre-processing and log clustering methods, in accordance with an example embodiment.

Referring now to FIG. 3, a schematic block diagram representation 300 of a process flow for data pre-processing and log clustering methods, is shown, in accordance with an embodiment of the present disclosure.

The processor 206 is configured to receive server logs (see, table 312) from the server 102 periodically. The processor 206 is configured to perform data pre-processing over the received server logs (see, 302). The processor 206 is configured to parse the server logs into a corresponding structured data sequence (see, 304). In one example, to parse the server logs, each piece of alphanumeric data within the server logs is separated into a number/sequence of tokens using a defined set of delimiters (e.g., spaces, equal signs, colons, semicolons, etc.). Each structured data sequence is configured to include a token extracted from its corresponding log. In other words, the processor 206 is configured to perform tokenization process over the server logs (see, 306). The server logs are tokenized such that lower-level information from the words or phrases of each server log can be identified and retrieved. However, heterogeneous logs from different servers have different formats and, thus, different tokenizers and delimiters. The token represents an execution path of an application that is being tracked by the server log. Then, the processor is configured to apply an unsupervised learning algorithm to generate unique log clusters. The processor 206 is configured to label each unique log clusters with a vector.

More specifically, the processor 206 is configured to apply word2vec model (see, 308, i.e., "log embedding") which was trained to generate vector representation (see, table 314) for each token associated with a unique server log.

Thereafter, the processor 206 is configured to apply a clustering algorithm for generating a set of distinct log clusters over the generated vectors for unique server logs (see, 310).

Figure 4:
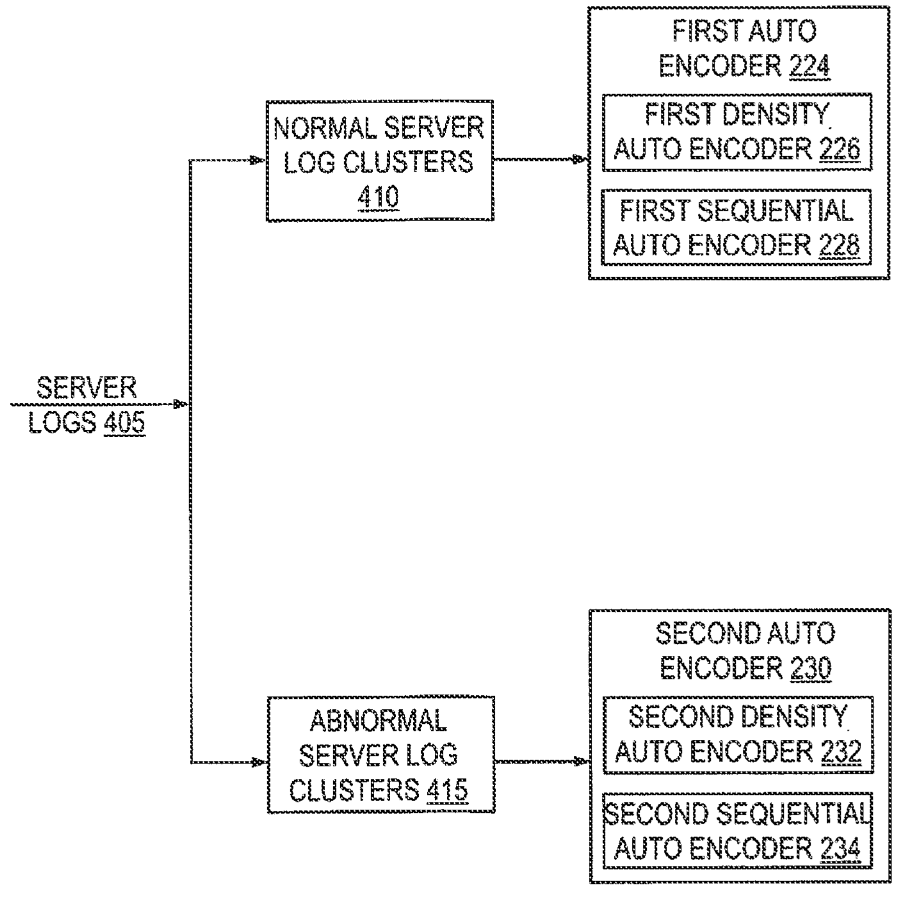
FIG. 4 is a schematic block diagram representation of a training process associated with the anomaly prediction system, in accordance with an example embodiment.

Referring now to FIG. 4, a schematic block diagram representation 400 of the training process associated with the anomaly prediction system 200, is shown, in accordance with an embodiment of the present disclosure. As mentioned previously, the processor 206 of the anomaly prediction system 200 includes first and second auto encoders which are trained based on server logs associated with the server 102 over a period of time.

During the training process, the processor 206 is configured to receive a plurality of server logs 405 over a period of time. The plurality of server logs are clustered in a set of distinct log clusters.

The first auto encoder 224 is configured to train using normal server log clusters 410 associated with the server 102. The normal server log clusters 410 represent server logs at a time when the server 102 works fine.

In a similar manner, the second auto encoder 230 is configured to train using abnormal server log clusters 415 associated with the server 102. The abnormal server log clusters 415 represent failure server logs at a time when the server 102 may be into faulty situations. In one embodiment, the abnormal server log clusters 415 from the plurality of server logs are identified based on word analysis model.

In one embodiment, the second auto encoder 230 may also be trained by log clusters which when are applied to the trained first auto encoder 224 generates a high reconstruction error output. Since the trained first auto encoder 224 generates a high reconstruction error that indicates the server logs associated with the log clusters as anomalous, therefore, these log clusters may relate to failure server logs. Hence, these log clusters can be used for training the second auto encoder 230.

Figure 5:
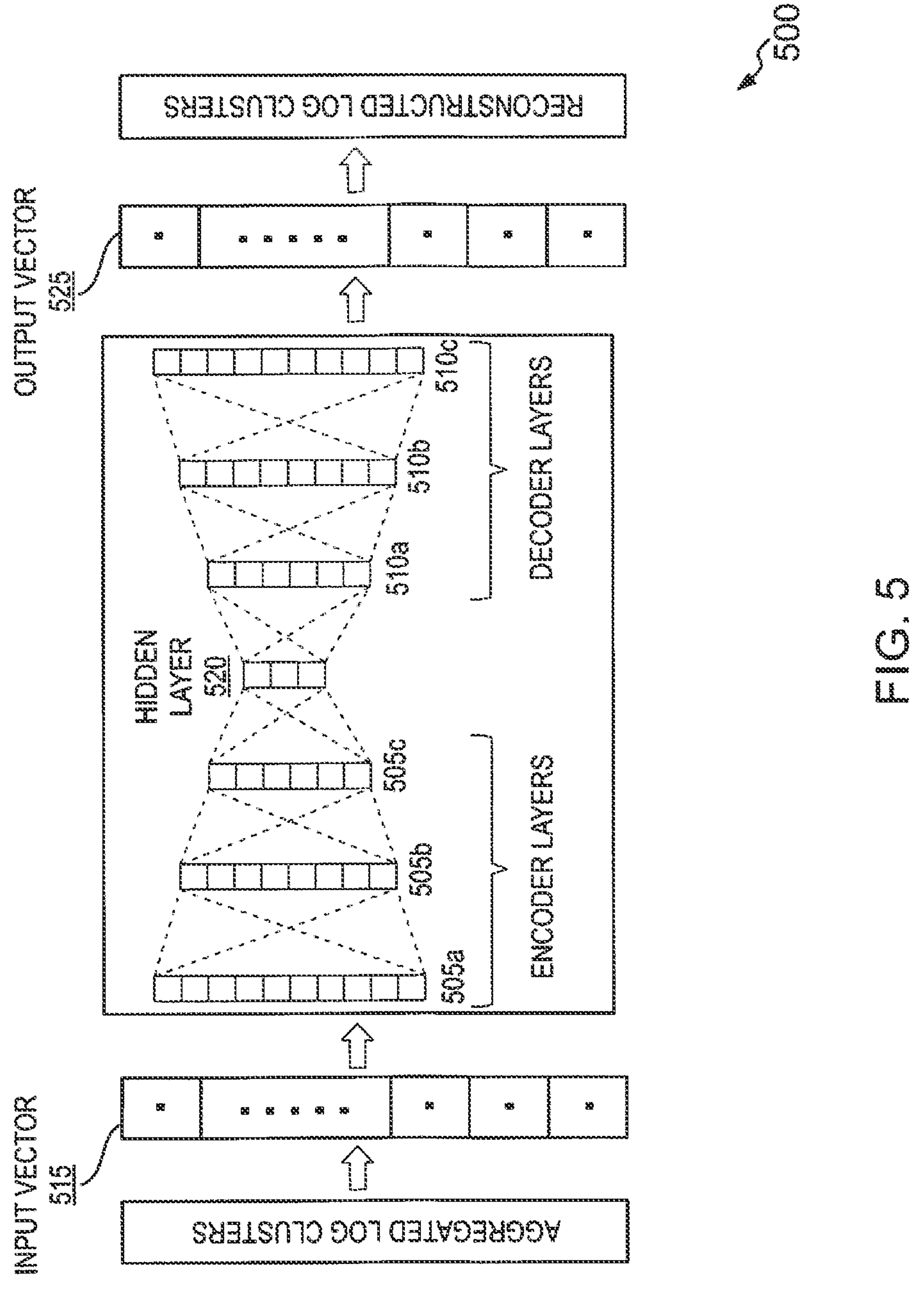
FIG. 5 represents a simplified block diagram of a stacked auto encoder, in accordance with an example embodiment.

Referring now to FIG. 5, a simplified block diagram of a stacked auto encoder 500, is shown, in accordance with an embodiment of the present disclosure. The first density auto encoder 226 and the second density auto encoder 232 are types of the stacked auto encoder that may include one or more encoder layers 505*a*, 505*b*, 505*c*, one or more decoder layers 510*a*, 510*b*, 510*c*. In general, the stacked auto encoder is a feed forward neural network in which neural networks, referred to as auto encoders, are stacked into layers. The auto encoder is a neural network in which the encoder layer and the decoder layer have the same number of neurons (the same number of units) and the middle layers (hidden layers) has less neurons (units) than the input layer (output layer). While three encoder layers and three decoder layers are depicted in figures, this is not meant to be limiting; in various embodiments, more or less encoder and/or decoder layers may be employed.

An input vector 515 for the stacked auto encoder 500 is a time invariant one dimensional vector, where a value at each index value of the input vector represents a normalized value of count of occurrence of an associated log cluster within a particular time interval. For example, suppose, number of total log clusters appeared within 3 hours window are 100 and a particular log cluster occurs 5 times within the 3 hours window, then, an input value (i.e., "normalized value") associated with the particular log cluster in the input vector will be 0.05 (i.e., number of appearance of the particular log cluster/total log clusters appeared within 3 hours window). The length of the input vector is equal to the number of the set of distinct log clusters.

The input vector is fed into a first encoder layer 505*a*. Each encoder layer reduces dimensions of the input vector by transforming the input into a new input vector of fewer dimensions. The dimensions of each encoder layer are different from the previous encoder layer (e.g., are not a subset of the dimensions from the previous encoder layer). The last encoder layer 505*c* feeds an output into a hidden layer 520.

The one or more decoder layers 510*a*, 510*b*, and 510*c* take an output of the hidden layer 520 as an input and try to reconstruct the same input vector at the last decoder layer 510*c*. A reconstructed vector (i.e., "output vector 525") may then be compared with the original input vector by calculating a reconstruction error (i.e., mean squared error $\|x-x'\|^2$). During the training process, the goal is to ensure that the reconstructed vector (i.e., "output vector 525") is the same as the original input vector. If the original input vector 515 and the reconstructed vector (i.e., "output vector 525") are different, various optimization techniques such as back propagation, stochastic gradient descent, etc., may be employed to adjust weights associated with the various encoder and decoder layers.

In one embodiment, the stacked auto encoder 500 is trained/fine-tuned based on a loss function which is utilized for updating weight parameters of connections among one or more encoder and decoder layers. The loss function is a function of a mean squared error (reconstruction error). More illustratively, the stacked auto encoder 500 evaluates the loss function that compares the output vector generated by the last decoder layer 510*c* to the input vector. Further, the stacked auto encoder 500 also evaluates a condition whether sum of all values present in the reconstructed vector is equal to '1' or not. Based on the evaluation, the stacked auto encoder 500 adjusts one or more parameters of one or both of the encoder layers and the decoder layers to improve (e.g., reduce or otherwise optimize) the loss function.

Once, after being trained or fine-tuned, the stacked auto encoder 500 encounters a plurality of log clusters with an aggregated reconstruction error greater than a predetermined threshold value, then it indicates that deviation of occurrences of the plurality of log clusters from a particular log pattern.

The first density auto encoder 226 (as shown in FIG. 2) is trained using normal server log data (when the server 102 is working normally). During the execution process, when the first density auto encoder 226 determines a reconstruction error (i.e., mean squared error) for server log clusters being higher than a threshold value, it means that frequency pattern of the server log clusters has an anomalous behavior.

In contrast, the second density auto encoder 232 is trained using abnormal server log data (when the server 102 is not working normally). During the execution process, the second density auto encoder 232 provides a low reconstruction error (i.e., mean squared error) for abnormal server logs. In one embodiment, the second density auto encoder 232 is trained using a set of log clusters at a time when the first density auto encoder 226 detects the abnormal server logs within the set of log clusters.

Figure 6A:
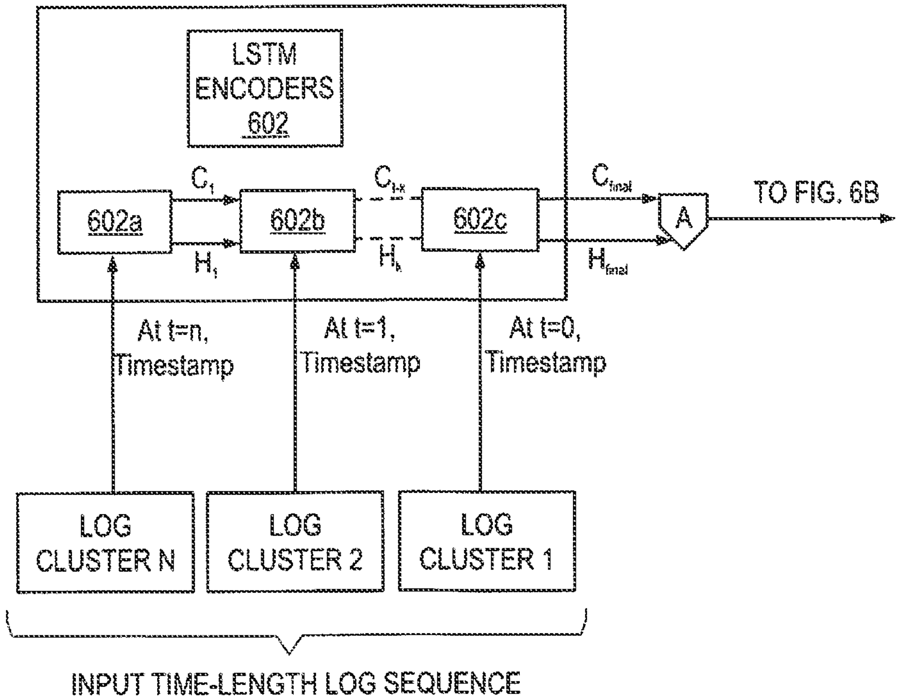
Figure 6B:
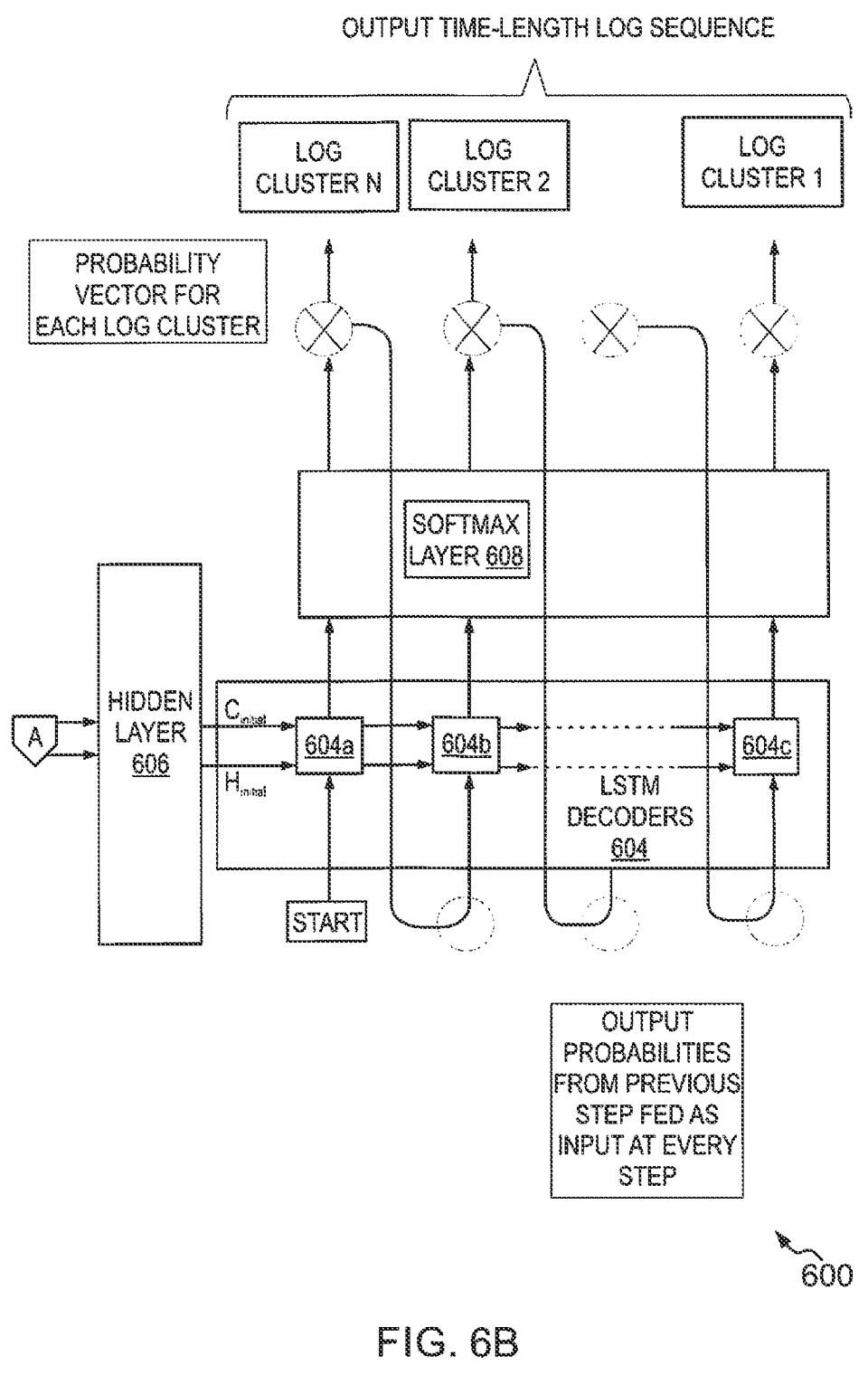

FIGS. 6A and 6B, collectively, represent a simplified block diagram of a Long Short Term Memory (LSTM) based sequential auto encoder 600, in accordance with an embodiment of the present disclosure. The first sequential auto encoder 228 and the second sequential auto encoder 234 are types of the LSTM based sequential auto encoder 600. The LSTM based sequential auto encoder 600 is a type of a deep neural network that models the sequence of log clusters using a Long Short-Term Memory (LSTM). This modeling ability allows for the automatic learning on different log pattern sequences from normal execution. Additionally, this modeling ability allows the system to flag deviations from normal system execution as anomalies.

As shown in the FIGS. 6A and 6B, a pair of LSTM encoder-decoder structure facilitates end-to-end mapping between an ordered multidimensional input sequence of log clusters and its matching output sequence. The LSTM based sequential auto encoder 600 includes LSTM encoders 602 and LSTM decoders 604. Although only three unrolled LSTM encoders are shown in FIGS. 6A and 6B, it will be appreciated that any number of LSTM blocks may be used (e.g., corresponding to the number of server logs that are selected for use). More particularly, a series of the LSTM encoders 602 is fed with multi-dimensional vectors representing log clusters which appear at different time stamps. The input to the LSTM encoders at each time stamp is simply a vector associated with a log cluster appeared at that timestamp. More specifically, a time length sequence of server log clusters is captured by the LSTM encoders 602 at the different timestamps. Further, a dummy log is also provided to the LSTM encoders 602 after each time length sequence of server log clusters.

Each LSTM encoder (e.g., 602*a*, 602*b*, 602*c*) learns a representation of a sequence of log clusters during a particular time interval and maintains a hidden vector "$H_k$," and a cell state vector "$C_{t-k}$". Both the hidden vector and the cell state vector are passed to a next LSTM encoder (e.g., from LSTM encoder 602*a* to LSTM encoder 602*b*) to initialize the next/subsequent LSTM encoder's state. At the end, hidden and cell state vectors of last LSTM encoder 602*c* are passed to a hidden layer 606.

As shown in the FIG. 6B, encoded hidden and cell state vectors are transferred to the LSTM decoders 604. The LSTM decoders 604*a*, 604*b* and 604*c* try to reconstruct the same input time-length log sequence at the output. A reconstructed time-length log sequence may then be compared with the original input time-length sequence by calculating a reconstruction error. The LSTM decoders 604 try to reconstruct the same input vector and generate a context decoder output and a current decoder hidden state at each decoder time step. Further, the introduced dummy log after each time length log sequence is utilized for stopping decoding process. The context decoder output of each LSTM decoder passes to a SoftMax layer 608 which generates a probability vector representing an occurrence of all the set of distinct clusters. The sum of all probability vector values is '1' which acts as one of constraints for reconstruction. In one example, if the LSTM decoders 604 could not be able to reconstruct more than a predetermined number of log clusters, the LSTM based sequential auto encoder 600 adjusts various factors of LSTM encoders and decoders.

In one non-limiting example, in order to configure the LSTM encoders 602 and the LSTM decoders 604, machine learning training techniques (e.g., using Stochastic Gradient Descent, back propagation, etc.) can also be used. Thus, the LSTM based sequential auto encoder 600 provides a prediction accuracy as an output which represents a reconstruction probability of a time-length log sequence of log clusters at decoder side.

In one embodiment, an LSTM based sequential auto encoder (i.e., "the first sequential auto encoder 228") is trained using normal server log data (when the server 102 is working normally). Further, during the execution process, when the first sequential auto encoder 228 detects a reconstruction probability for a sequence of server log clusters being higher than a threshold value, it means that the sequence of the server log clusters has an anomalous behavior.

In one embodiment, an LSTM based sequential auto encoder (i.e., "the second sequential auto encoder 234") is trained (when the server 102 is not working normally). Additionally, during the execution process, when the second sequential auto encoder 234 provides a higher reconstruction probability (i.e., prediction accuracy) than a threshold value, it means that the sequence of the server log clusters has the anomalous behavior and may cause server failure in near future.

Figure 7A:
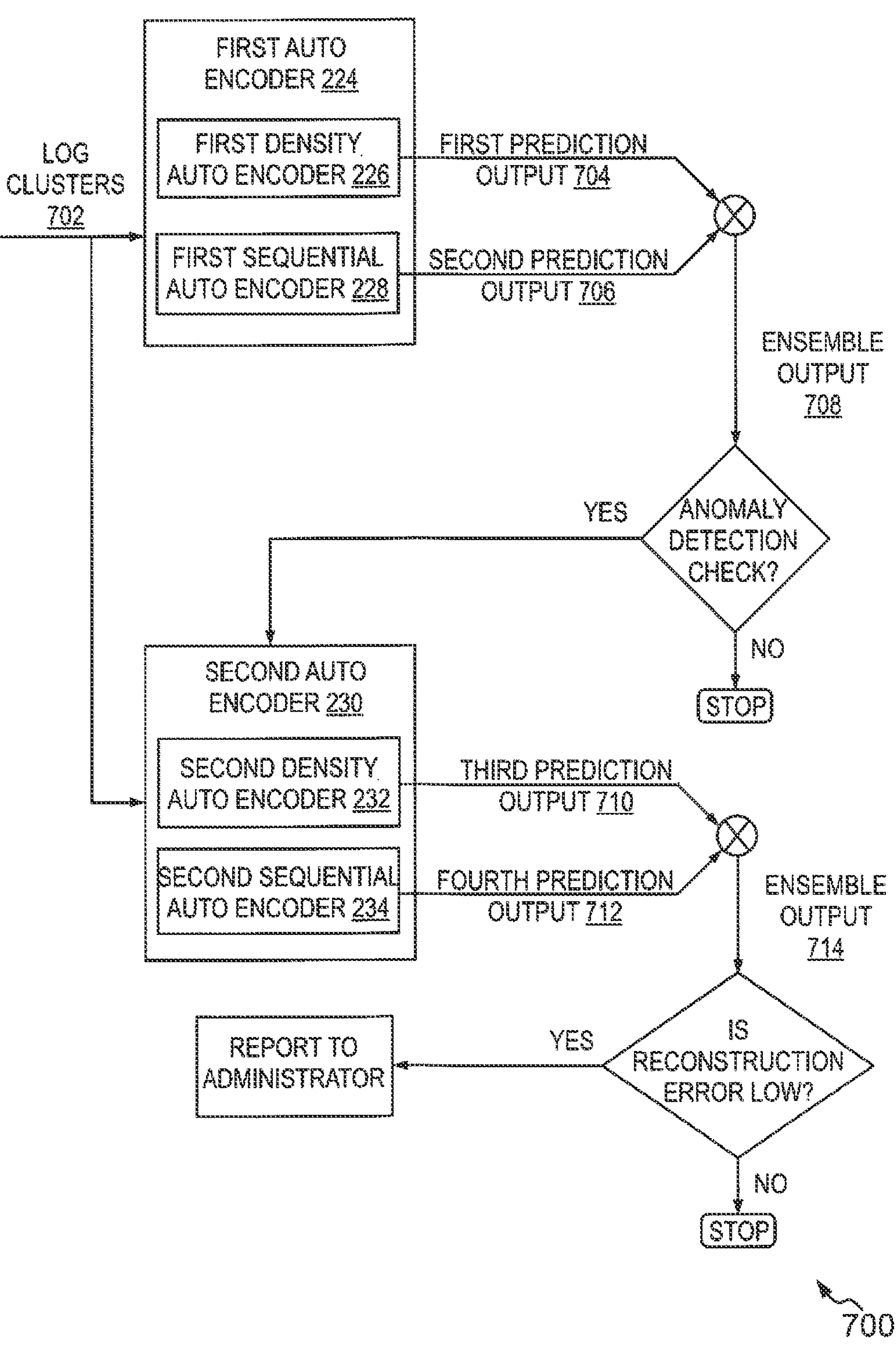
FIG. 7A is a schematic block diagram representation of execution process (i.e., “detection process”) associated with the anomaly prediction system, in accordance with one embodiment of the present disclosure.

Referring now to FIG. 7A, a schematic block diagram representation 700 of execution process associated with the anomaly prediction system 200, is shown, in accordance with an embodiment of the present disclosure.

As mentioned previously, the first auto encoder 224 is trained based on healthy server logs. The second auto encoder 230 is trained based on unhealthy server logs (i.e., "failure server logs").

In one embodiment, during the execution phase, log clusters 702 are initially fed into the first auto encoder 224 which was trained on the healthy server logs. The first density auto encoder 226 and the first sequential auto encoder 228 generate a first prediction output 704 and a second prediction output 706, respectively. The first prediction output 704 represents a reconstruction probability of each log cluster. The second prediction output 706 represents a prediction probability of log pattern sequence of log clusters.

In one non-limiting example, if a particular log cluster "A" is occurred four times in a time window that is more than usual occurrence (i.e., "two times") of the particular log cluster "A" during the time window, the first density auto encoder 226 would generate the first prediction output indicating a likelihood of next occurrence of the particular log cluster "A" to have anomalous behavior.

In another non-limiting example, suppose, a set of log clusters "A", "B", and "C" generally occurs in a sequence under normal execution of the server 102. In one scenario, when the log cluster "B" occurs after a log cluster "D", the first sequential auto encoder 228 detects an anomalous log sequence of the server 102. Therefore, the first sequential auto encoder 228 generates the second prediction output indicating a likelihood of log sequences of the log clusters to have the anomalous behavior.

Thereafter, the first prediction output 704 and the second prediction output 706 are ensembled using a weighted average ensemble approach for obtaining an ensemble output 708. If the ensemble output 708 is beyond a predetermined threshold value (i.e., "the first auto encoder 224 detects anomalies in the log clusters"), the log clusters 702 are passed to the second auto encoder 230. In one embodiment, if one of the second density and sequential auto encoders of the second auto encoder 230 is able to reconstruct the particular log cluster of the log clusters 702 successfully, it infers that the particular log cluster is an abnormal server log. In other words, in response to identification of the server anomalies by the first density auto encoder 226 and the first sequential auto encoder 228, a second density machine learning model (implemented at the second density auto encoder 232) and a second sequential machine learning model (implemented at the second sequential machine learning model) are applied over the log clusters 702.

The second density auto encoder 232 and the second sequential auto encoder 234 generate a third prediction output 710 and a fourth prediction output 712, respectively. The third prediction output 710 and the fourth prediction output 712 are ensembled using a weighted average ensemble approach for obtaining an ensemble output 714. If the ensemble output 714 does not satisfy threshold conditions, it means that the logs clusters 702 may have some anomalies and the server 102 may get into failure situations in near future. Thereafter, the processor 206 sends alerts to administrators about future server failure so that preventive actions can be taken.

Referring now to FIG. 7B, a schematic block diagram representation 720 of the execution process (i.e., "detection phase") associated with the anomaly prediction system 200, is shown, in accordance with another embodiment of the present disclosure. During the execution process, all the log clusters 722 are initially fed into the first auto encoder 224 and the second auto encoder 230 simultaneously.

During the execution process, the first density auto encoder 226 generates a first prediction output 724 (i.e., "a mean squared error (MSE)") associated with each log cluster of the server 102. The first sequential auto encoder 228 generates a second prediction output 726 (i.e., probabilities of temporal occurrence of each log cluster) associated with a time length sequence of the log clusters 722.

Similarly, the second density auto encoder 232 of the second auto encoder 230 generates a third prediction output 728 (i.e., "a mean squared error (MSE)") associated with each log cluster of the server 102. The second sequential auto encoder 234 of the second auto encoder 230 generates a fourth prediction output 730 (i.e., probabilities of temporal occurrence of each log cluster) associated with a time length sequence of log clusters of the server 102.

Thereafter, the processor 206 generates an ensemble output 732 by aggregating the first, second, third and fourth prediction outputs based on a weighted average ensemble approach. In particular, the processor 206 compares the ensemble output with a predetermined threshold value. If the ensemble output 732 is beyond a predetermined threshold value, the processor 206 notifies administrators about future sever failures in real time and provides information of a particular log cluster because of which the server 102 may get into faulty situations in near future.

In one embodiment, the processor 206 generates an ensemble output of the first, second, third and fourth prediction outputs by using an LSTM model based on a weighted average ensemble approach within a specific time frame. By utilizing time series ensembling methods, the anomaly prediction system 200 may generate an alert only when a particular server failure occurs more than a particular count within the specific time frame. In one embodiment, the anomaly prediction system 200 detects an anomaly only when a reconstruction error associated with a particular log cluster during the specific time frame is higher than a limiting value. Thus, the anomaly prediction system 200 reduces false alerts provided to the administrators and provides precise early warnings of future server failure based on its severity level.

Figure 8A:
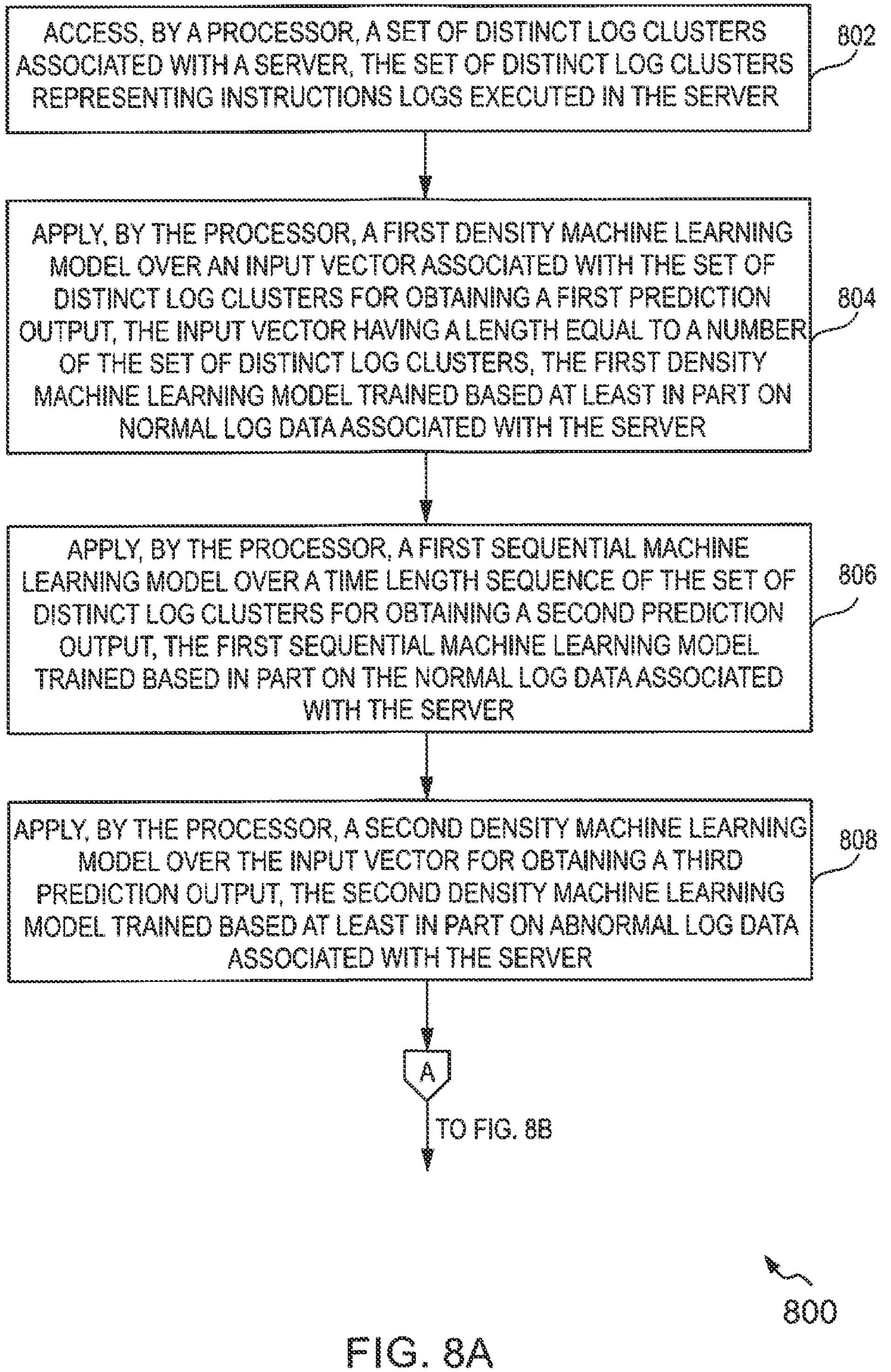
FIGS. 8A and 8B, collectively, represent a flow diagram of a method for predicting future server failures using server logs, in accordance with an example embodiment.
Figure 8B:
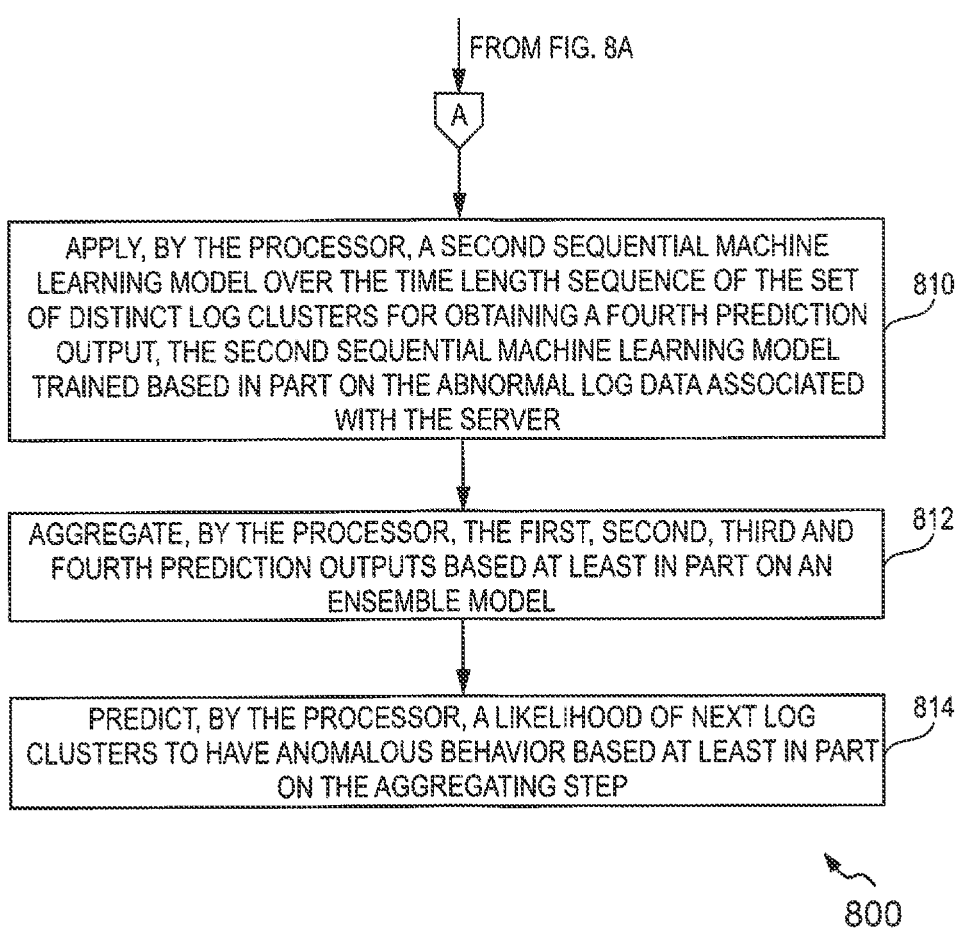

FIGS. 8A and 8B, collectively, represent a flow diagram of a computer-implemented method 800 for predicting future server failures using server logs, in accordance with an example embodiment. The method 800 depicted in the flow diagram may be executed by the anomaly prediction system 104 or the anomaly prediction system 200. Operations of the method 800, and combinations of operation in the method 800, may be implemented by, for example, hardware, firmware, a processor, circuitry and/or a different device associated with the execution of software that includes one or more computer program instructions. The method 800 starts at operation 802.

As shown in the FIG. 8A, at the operation 802, the method 800 includes accessing, by a processor 206, a set of distinct log clusters associated with a server 102 (as shown in FIG. 1). The set of distinct log clusters represents instruction logs executed in the server during a particular time interval. The distinct log clusters represent a total group of different unique server logs.

At operation 804, the method 800 includes applying, by the processor 206, a first density machine learning model over an input vector associated with the set of distinct log clusters for obtaining a first prediction output. The input vector has a length equal to a number of the set of distinct log clusters. The first density machine learning model is trained based on normal log data associated with the server 102. In one embodiment, the method 800 includes generating the input vector associated with the set of distinct log clusters. A value for each index of the input vector represents a frequency of appearances of each associated log cluster of the set of distinct log clusters during a particular time interval.

At operation 806, the method 800 includes applying, by the processor 206, a first sequential machine learning model over a time length sequence of the set of distinct log clusters for obtaining a second prediction output. The first sequential machine learning model is trained based on the normal log data associated with the server 102. The time-length sequence of the set of distinct log clusters is generated during the particular time interval.

At operation 808, the method 800 includes applying, by the processor 206, a second density machine learning model over the input vector for obtaining a third prediction output. The second density machine learning model is trained based on abnormal log data associated with the server 102.

As shown in the FIG. 8B, at operation 810, the method 800 includes applying, by the processor 206, a second sequential machine learning model over the time length sequence of the set of distinct log clusters for obtaining a fourth prediction output. The second sequential machine learning model is trained based on the abnormal log data associated with the server 102.

At operation 812, the method 800 includes aggregating, by the processor 206, the first, second, third and fourth prediction outputs based on an ensemble model. For aggregating, the first, second, third and fourth prediction outputs are ensembled using a recurrent neural network model (e.g., "LSTM") based on a weighted average ensemble method for obtaining an ensemble output.

At operation 814, the method 800 includes predicting, by the processor 206, a likelihood of next log clusters to have anomalous behavior based on the aggregating step.

Figure 9:
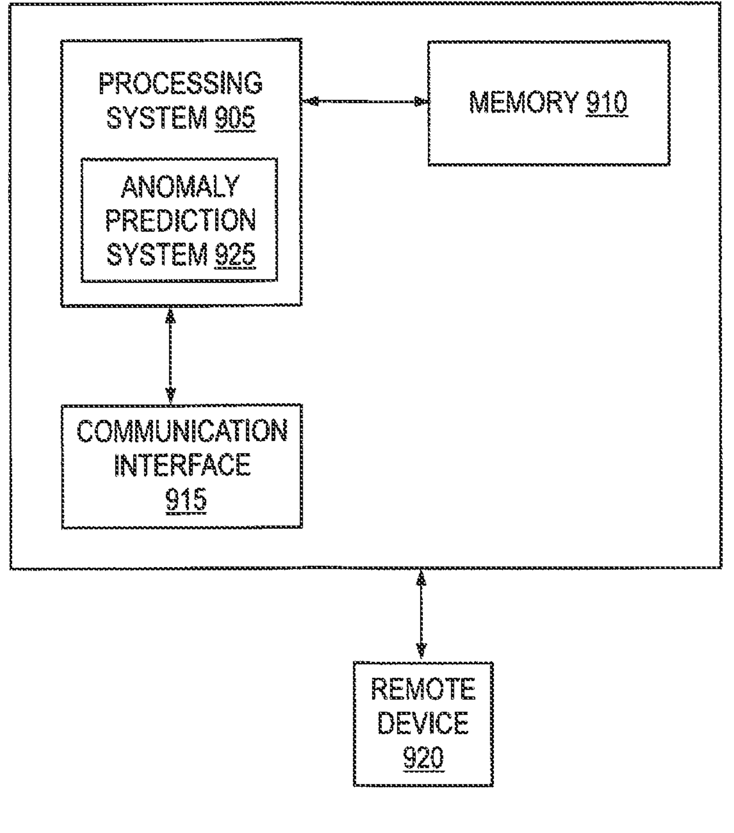
FIG. 9 is a simplified block diagram of a payment interface server, in accordance with an example embodiment of the present disclosure.

FIG. 9 is a simplified block diagram of a payment interface server 900, in accordance with an embodiment of the present disclosure. The payment interface server 900 is an example of the server 102 of FIG. 1. A payment network may be used by the payment interface server 900 as a payment interchange network. Examples of payment interchange network include, but not limited to, Mastercard® payment system interchange network. The payment interface server 900 includes a processing system 905 configured to extract programming instructions from a memory 910 to provide various features of the present disclosure. Further, two or more components may be embodied in one single component, and/or one component may be configured using multiple sub-components to achieve the desired functionalities. Some components of the payment interface server 900 may be configured using hardware elements, software elements, firmware elements and/or a combination thereof. In one embodiment, the payment interface server 900 is configured to determine future server failures based on server logs processed within a particular time window.

Via a communication interface 915, the processing system 905 receives information from a remote device 920 such as one or more databases, or an administrator monitoring server activities. The processing system 905 also includes an anomaly prediction system 925. The payment interface server 900 may also perform similar operations as performed by the anomaly prediction system 200 for predicting server failures by capturing different anomalous behaviors of the server logs using one or more machine learning models. For the sake of brevity, the detailed explanation of the payment interface server 900 is omitted herein with reference to the FIG. 2.

FIG. 10 shows experiment results of an anomaly prediction system implemented in the payment interface server, depicting comparative analysis of different models used in some embodiments of the present disclosure with respect to conventional models used for server anomaly prediction.

The experiment table 1000 lists all of experiment results associated with some of the existing anomaly detectors (e.g., see rows 1002 and 1004) and different configurations of anomaly prediction systems (e.g., see rows 1006 to 1010) in the payment interface server 900. The experiment results depict different result parameters such as true server failure alerts and false server failure alerts of different models used for server anomaly detection. In a first row 1002, the experiment result of the conventional anomaly prediction systems (not in accordance with the embodiments of the present disclosure) using only density machine learning model is shown. In a second row 1004, the experiment result of another conventional anomaly prediction systems (not in accordance with the embodiments of the present disclosure) using only sequential machine learning model is shown. As shown in the FIG. 10, it is understood that only using either the density machine learning model or the sequential machine learning model generates very high false alerts which may be a cumbersome task for analysts to determine which alerts should be considered as future server failure alerts.

The next three rows 1006, 1008, and 1010 depict experiment results of different embodiments of the present disclosure.

In the third row 1006, an anomaly prediction system is used with an ensemble modeling of both the density and sequential machine learning models.

In the fourth row 1008, an anomaly prediction system is used with an ensemble model of first auto encoder 224 (as shown in the FIG. 2) and the second auto encoder 230 which are trained on normal and abnormal server logs, respectively. The anomaly prediction system predicts server failure according to a process as mentioned with reference to FIG. 7A.

In the fifth row 1010, an anomaly prediction system is used with an ensemble model using LSTM model of a first auto encoder 224 (as shown in the FIG. 2) and the second auto encoder 230 which are trained on normal and abnormal server logs, respectively. The anomaly prediction system predicts server failure according to a process as mentioned with reference to FIG. 7B.

As shown in the FIG. 10, the ensemble model (see, the row 1010) provides false server failure alerts equal to '18' smaller as compared to the conventional anomaly prediction systems (see, rows 1002 and 1004) which provide false server failure alerts equal to '16000' and '37000', respectively. Thus, the ensemble model (see, the row 1010) used in the anomaly prediction system according to the present disclosure enables provision of server failure alerts with a higher precision rate and a very low false alert rate.

Figure 11:
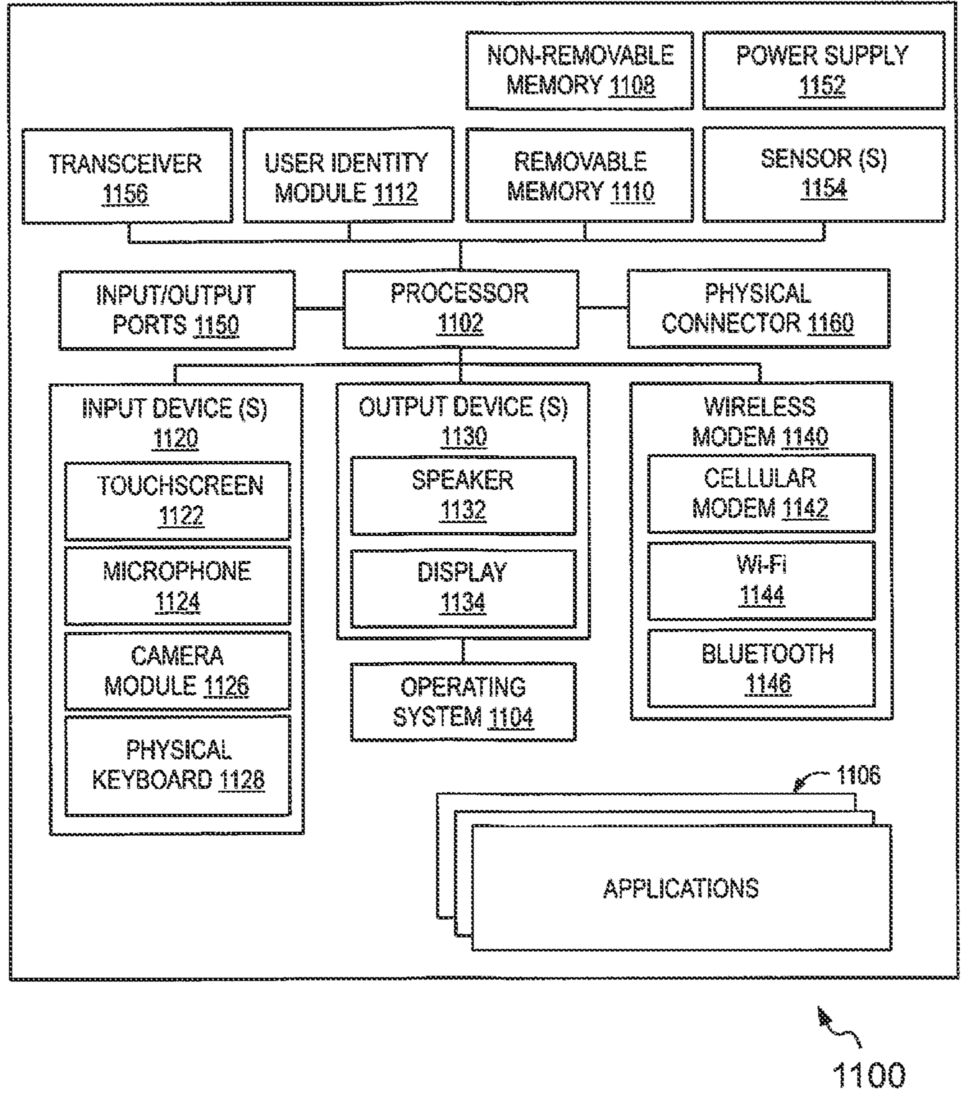
FIG. 11 is a simplified block diagram of a user device associated with a user capable of implementing at least some embodiments of the present disclosure.

FIG. 11 shows a simplified block diagram of a user device 1100, for example, a mobile phone or a desktop computer capable of implementing the various embodiments of the present disclosure. For example, the user device 1100 may correspond to user devices associated with analysts/regulators who will get notifications of future server failure. The user device 1100 is depicted to include one or more applications 1106 (e.g., "server monitoring application"). The applications 1106 can be an instance of an application downloaded from a third-party server.

It should be understood that the user device 1100 as illustrated and hereinafter described is merely illustrative of one type of device and should not be taken to limit the scope of the embodiments. As such, it should be appreciated that at least some of the components described below in connection with the user device 1100 may be optional and thus in an example embodiment may include more, less or different components than those described in connection with the example embodiment of the FIG. 11. As such, among other examples, the user device 1100 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated user device 1100 includes a controller or a processor 1102 (e.g., a signal processor, microprocessor, ASIC, or other control and processing logic circuitry) for performing such tasks as signal coding, data processing, image processing, input/output processing, power control, and/or other functions. An operating system 1104 controls the allocation and usage of the components of the user device 1100. In addition, the applications 1106 may include common server performance monitoring applications or any other computing application.

The illustrated user device 1100 includes one or more memory components, for example, a non-removable memory 1108 and/or removable memory 1110. The non-removable memory 1108 and/or the removable memory 1110 may be collectively known as a database in an embodiment. The non-removable memory 1108 can include RAM, ROM, flash memory, a hard disk, or other well-known memory storage technologies. The removable memory 1110 can include flash memory, smart cards, or a Subscriber Identity Module (SIM). The one or more memory components can be used for storing data and/or code for running the operating system 1104 and the applications 1106. The user device 1100 may further include a user identity module (UIM) 1112. The UIM 1112 may be a memory device having a processor built in. The UIM 1112 may include, for example, a subscriber identity module (SIM), a universal integrated circuit card (UICC), a universal subscriber identity module (USIM), a removable user identity module (R-UIM), or any other smart card. The UIM 1112 typically stores information elements related to a mobile subscriber. The UIM 1112 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The user device 1100 can support one or more input devices 1120 and one or more output devices 1130. Examples of the input devices 1120 may include, but are not limited to, a touch screen/a display screen 1122 (e.g., capable of capturing finger tap inputs, finger gesture inputs, multi-finger tap inputs, multi-finger gesture inputs, or keystroke inputs from a virtual keyboard or keypad), a microphone 1124 (e.g., capable of capturing voice input), a camera module 1126 (e.g., capable of capturing still picture images and/or video images) and a physical keyboard 1128. Examples of the output devices 1130 may include, but are not limited to a speaker 1132 and a display 1134. Other possible output devices can include piezoelectric or other haptic output devices. Some devices can serve more than one input/output function. For example, the touch screen 1122 and the display 1134 can be combined into a single input/output device.

A wireless modem 1140 can be coupled to one or more antennas (not shown in the FIG. 11) and can support two-way communications between the processor 1102 and external devices, as is well understood in the art. The wireless modem 1140 is shown generically and can include, for example, a cellular modem 1142 for communicating at long range with the mobile communication network, a Wi-Fi compatible modem 1144 for communicating at short range with an external Bluetooth-equipped device or a local wireless data network or router, and/or a Bluetooth-compatible modem 1146. The wireless modem 1140 is typically configured for communication with one or more cellular networks, such as a GSM network for data and voice communications within a single cellular network, between cellular networks, or between the user device 1100 and a public switched telephone network (PSTN).

The user device 1100 can further include one or more input/output ports 1150, a power supply 1152, one or more sensors 1154, for example, an accelerometer, a gyroscope, a compass, or an infrared proximity sensor for detecting the orientation or motion of the user device 1100 and biometric sensors for scanning biometric identity of an authorized user, a transceiver 1156 (for wirelessly transmitting analog or digital signals) and/or a physical connector 1160, which can be a USB port, IEEE 1294 (FireWire) port, and/or RS-232 port. The illustrated components are not required or all-inclusive, as any of the components shown can be deleted and other components can be added.

The disclosed method with reference to FIGS. 8A and 8B, or one or more operations of the anomaly prediction system 200 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the anomaly prediction system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

We claim:

1. A computer-implemented method, comprising:

accessing, by a processor, a set of distinct log clusters associated with a server, the set of distinct log clusters;

configuring, by the processor, a first density machine learning model based on a stacked autoencoder configured with a loss function that includes a Log-Cosh component and a constraint on a summation of frequency appearances of the set of distinct log clusters, the loss function structured to enable the autoencoder to reconstruct an input vector even when some log clusters are less frequent;

applying, by the processor, the first density machine learning model over the input vector associated with the set of distinct log clusters for obtaining a first prediction output, the input vector having a length equal to a number of the set of distinct log clusters, the first density machine learning model trained based on normal log data associated with the server to detect a first deviation of an input vector from an expected density distribution of log data that corresponds to normal operation, and generating the first prediction output based on the first deviation;

applying, by the processor, a first sequential machine learning model over a time length sequence of the set of distinct log clusters for obtaining a second prediction output, the first sequential machine learning model trained based on the normal log data associated with the server to detect a second deviation of the input vector from an expected sequence of the log data that corresponds to normal operation, and generating the second prediction output based on the second deviation;

wherein the first sequential machine learning model trained on the normal log data of the server is implemented using a Long Short Term Memory (LSTM) based sequential auto encoder;

applying, by the processor, a second density machine learning model over the input vector for obtaining a third prediction output, the second density machine learning model trained based on abnormal log data associated with the server to detect a third deviation of the input vector from an expected density distribution of the log data that corresponds to abnormal operation, and generating the third prediction output based on the third deviation;

applying, by the processor, a second sequential machine learning model over the time length sequence of the set of distinct log clusters for obtaining a fourth prediction output, the second sequential machine learning model trained based on the abnormal log data associated with the server to detect a fourth deviation of the input vector from an expected sequence of the log data that corresponds to abnormal operation, and generating the fourth prediction output based on the fourth deviation;

wherein the second density machine learning model trained on the abnormal log data of the server is implemented using a stacked auto encoder, and the second sequential machine learning model trained on the abnormal log data of the server is implemented using a Long Short Term Memory (LSTM) based sequential auto encoder;

aggregating, by the processor, the first, second, third and fourth prediction outputs based on an ensemble model; and predicting, by the processor, a likelihood of next log clusters to have anomalous behavior based on the aggregating.

2. The computer-implemented method of claim 1, further comprising:

receiving, by the processor, a plurality of server logs from the server within a particular time interval; and performing, by the processor, data pre-processing over the plurality of server logs for clustering the plurality of server logs into the set of distinct log clusters.

3. The computer-implemented method of claim 2, further comprising:

generating, by the processor, the input vector associated with the set of distinct log clusters, a value for each index of the input vector representing a frequency of appearances of each associated log cluster of the set of distinct log clusters during the particular time interval; and identifying, by the processor, the time length sequence of the set of distinct log clusters processed during the particular time interval.

4. The computer-implemented method of claim 1, wherein aggregating the first, second, third and fourth prediction outputs based on the ensemble model comprises:

ensembling, by the processor, the first, second, third and fourth prediction outputs using a recurrent neural network model based at least on a weighted average ensemble method for obtaining an ensemble output.

5. The computer-implemented method of claim 4, further comprising:

comparing, by the processor, the ensemble output with a predetermined threshold value for determining the likelihood of the next log clusters to have the anomalous behavior; and sending, by the processor, an alert to an administrator about future server failure occurrences based on the step of the predicting.

6. An anomaly prediction system, comprising:

a communication interface;

a memory comprising executable instructions; and a processor communicably coupled to the communication interface, the processor configured to execute the executable instructions to cause the anomaly prediction system to at least:

access a set of distinct log clusters associated with a server, the set of distinct log clusters representing instructions executed in the server;

configure a first density machine learning model based on a stacked autoencoder configured with a loss function that includes a Log-Cosh component and a constraint on a summation of frequency appearances of the set of distinct log clusters, the loss function structured to enable the autoencoder to reconstruct an input vector even when some log clusters are less frequent;

apply the first density machine learning model over the input vector associated with the set of distinct log clusters for obtaining a first prediction output, the input vector having a length equal to a number of the set of distinct log clusters, the first density machine learning model trained based on normal log data associated with the server, to detect a first deviation of an input vector from an expected density distribution of log data that corresponds to normal operation, and generating the first prediction output based on the first deviation;

apply a first sequential machine learning model over a time length sequence of the set of distinct log clusters for obtaining a second prediction output, the first sequential machine learning model trained based on the normal log data associated with the server, to detect a second deviation of the input vector from an expected sequence of the log data that corresponds to normal operation, and generating the second prediction output based on the second deviation;

wherein the first sequential machine learning model trained on the normal log data of the server is implemented using a Long Short Term Memory (LSTM) based sequential auto encoder;

apply a second density machine learning model over the input vector for obtaining a third prediction output, the second density machine learning model trained based on abnormal log data associated with the server, to detect a third deviation of the input vector from an expected density distribution of the log data that corresponds to abnormal operation, and generating the third prediction output based on the third deviation, apply a second sequential machine learning model over the time length sequence of the set of distinct log clusters for obtaining a fourth prediction output, the second sequential machine learning model trained based on the abnormal log data associated with the server, to detect a fourth deviation of the input vector from an expected sequence of the log data that corresponds to abnormal operation, and generating the fourth prediction output based on the fourth deviation;

wherein the second density machine learning model trained on the abnormal log data of the server is implemented using a stacked auto encoder, and the second sequential machine learning model trained on the abnormal log data of the server is implemented using a Long Short Term Memory (LSTM) based sequential auto encoder;

update, dynamically during a detection phase based on feedback indicating a misclassification, a probability weight distribution of: the first density machine learning model, the first sequential machine learning model, the second density machine learning model, and/or the second sequential machine learning model, thereby adapting to new log patterns to improve respective model performance;

aggregate the first, second, third and fourth prediction outputs based on an ensemble model; and predict a likelihood of next log clusters to have anomalous behavior based on the aggregating.

7. The anomaly prediction system of claim 6, wherein the processor comprises:

a data pre-processing engine, a first auto encoder comprising a first density auto encoder and a first sequential auto encoder, a second auto encoder comprising a second density auto encoder and a second sequential auto encoder, an ensemble manager, and a prediction engine.

8. The anomaly prediction system of claim 7, wherein the data pre-processing engine is configured to:

receive a plurality of server logs from the server within a particular time interval, and perform data pre-processing over the plurality of server logs to cluster the plurality of server logs into the set of distinct log clusters.

9. The anomaly prediction system of claim 8, wherein the anomaly prediction system is further caused to:

generate the input vector associated with the set of distinct log clusters, a value for each index of the input vector representing a frequency of appearances of each associated log cluster of the set of distinct log clusters during the particular time interval, and identify the time length sequence of the set of distinct log clusters processed during the particular time interval.

10. The anomaly prediction system of claim 7, wherein, to aggregate the first, second, third and fourth prediction outputs, the ensemble manager is configured to:

ensemble the first, second, third and fourth prediction outputs using a recurrent neural network model based at least on a weighted average ensemble method of obtaining an ensemble output.

11. The anomaly prediction system of claim 10, wherein the prediction engine is configured to:

compare the ensemble output with a predetermined threshold value to determine the likelihood of the next log clusters to have the anomalous behavior, and send an alert to an administrator about future server failure occurrence based on the comparison.

12. A computer-implemented method, comprising:

accessing, by a processor, a set of distinct log clusters associated with a server, the set of distinct log clusters representing instructions executed in the server;

configuring, by the processor, a first density machine learning model based on a stacked autoencoder configured with a loss function that includes a Log-Cosh component and a constraint on a summation of frequency appearances of the set of distinct log clusters, the loss function structured to enable the autoencoder to reconstruct an input vector even when some log clusters are less frequent;

applying, by the processor, the first density machine learning model over the input vector associated with the set of distinct log clusters for obtaining a first prediction output, the input vector having a length equal to a number of the set of distinct log clusters, the first density machine learning model trained based on normal log data associated with the server to detect a first deviation of an input vector from an expected density distribution of log data that corresponds to normal operation, and generating the first prediction output based on the first deviation;

applying, by the processor, a first sequential machine learning model over a time length sequence of the set of distinct log clusters for obtaining a second prediction output, the first sequential machine learning model trained based on the normal log data associated with the server to detect a second deviation of the input vector from an expected sequence of the log data that corresponds to normal operation, and generating the second prediction output based on the second deviation;

wherein the first sequential machine learning model trained on the normal log data of the server is implemented using a Long Short Term Memory (LSTM) based sequential auto encoder;

generating, by the processor, an ensemble output of the first prediction output and the second prediction output for identifying whether server anomalies are detected or not; and in response to identification of the server anomalies, performing:

applying, by the processor, a second density machine learning model over the input vector for obtaining a third prediction output, the second density machine learning model trained based on abnormal log data associated with the server to detect a third deviation of the input vector from an expected density distribution of the log data that corresponds to abnormal operation, and generating the third prediction output based on the third deviation;

applying, by the processor, a second sequential machine learning model over the time length sequence of the set of distinct log clusters for obtaining a fourth prediction output, the second sequential machine learning model trained based on the abnormal log data associated with the server to detect a fourth deviation of the input vector from an expected sequence of the log data that corresponds to abnormal operation, and generating the fourth prediction output based on the fourth deviation;

wherein the second density machine learning model trained on the abnormal log data of the server is implemented using a stacked auto encoder, and the second sequential machine learning model trained on the abnormal log data of the server is implemented using a Long Short Term Memory (LSTM) based sequential auto encoder;

updating, by the processor, dynamically during a detection phase based on feedback indicating a misclassification, a probability weight distribution of: the first density machine learning model, the first sequential machine learning model, the second density machine learning model, and/or the second sequential machine learning model, thereby adapting to new log patterns to improve respective model performance;

generating, by the processor, a second ensemble output of the third prediction output and the fourth prediction output based at least part on an ensemble model;

predicting, by the processor, a likelihood of next log clusters to have anomalous behavior based on the second ensemble output.

13. The computer-implemented method of claim 12, further comprising:

generating, by the processor, the input vector associated with the set of distinct log clusters, a value for each index of the input vector representing a frequency of appearances of each associated log cluster of the set of distinct log clusters during a particular time interval; and identifying, by the processor, the time length sequence of the set of distinct log clusters processed during the particular time interval.

14. The computer-implemented method of claim 12, wherein predicting the likelihood of the next log clusters to have the anomalous behavior based on the second ensemble output comprises:

comparing the second ensemble output with a predetermined threshold value for determining the likelihood of the next log clusters to have the anomalous behavior; and sending an alert to an administrator about future server failure occurrences based at least on a step of the comparing.

* * * * *